(12) United States Patent
Glenn et al.

(10) Patent No.: US 6,763,282 B2
(45) Date of Patent: Jul. 13, 2004

(54) METHOD AND SYSTEM FOR CONTROLLING A ROBOT

(75) Inventors: Susan J. Glenn, Huntsville, AL (US); Gregory A. Shreve, Huntsville, AL (US)

(73) Assignee: Time Domain Corp., Huntsville, AL (US)

( * ) Notice: Subject to any disclaimer, the term of this patent is extended or adjusted under 35 U.S.C. 154(b) by 0 days.

(21) Appl. No.: 09/873,639

(22) Filed: Jun. 4, 2001

(65) Prior Publication Data

US 2003/0028286 A1 Feb. 6, 2003

(51) Int. Cl.⁷ .............................................. G06F 19/00
(52) U.S. Cl. ...................... 700/245; 700/247; 700/248; 700/249; 700/250; 700/259; 700/318; 700/568.11; 700/568.12; 375/130; 375/316; 342/89
(58) Field of Search .............................. 700/245, 248, 700/258, 250, 259, 247, 249; 318/568.11, 568.12; 342/89; 375/130, 316

(56) References Cited

U.S. PATENT DOCUMENTS

| | | | |
|---|---|---|---|
| 4,641,317 A | 2/1987 | Fullerton ..................... 375/1 |
| 4,813,057 A | 3/1989 | Fullerton ................... 375/37 |
| 4,979,186 A | 12/1990 | Fullerton ..................... 375/1 |
| 5,285,209 A | 2/1994 | Sharpin et al. ............ 342/424 |
| 5,363,108 A | 11/1994 | Fullerton .................... 342/27 |
| 5,608,412 A * | 3/1997 | Welles et al. .............. 342/457 |
| 5,677,927 A | 10/1997 | Fullerton et al. .......... 375/200 |
| 5,686,888 A * | 11/1997 | Welles et al. ............. 340/3.31 |
| 5,687,169 A | 11/1997 | Fullerton ................... 370/324 |
| 5,691,980 A * | 11/1997 | Welles et al. .............. 340/989 |
| 5,764,696 A | 6/1998 | Barnes et al. .............. 375/239 |
| 5,819,008 A * | 10/1998 | Asama et al. .......... 318/568.12 |
| 5,825,981 A * | 10/1998 | Matsuda ................ 318/568.16 |
| 5,832,035 A | 11/1998 | Fullerton .................... 375/210 |
| 6,111,536 A | 8/2000 | Richards et al. ............ 342/125 |
| 6,133,876 A | 10/2000 | Fullerton et al. ........... 342/375 |
| 6,175,206 B1 * | 1/2001 | Ueno et al. .............. 318/568.1 |
| 6,177,903 B1 | 1/2001 | Fullerton et al. ............. 342/28 |
| 6,218,979 B1 | 4/2001 | Barnes et al. ................. 342/28 |
| 6,300,903 B1 | 10/2001 | Richards et al. ............ 342/450 |
| 6,300,914 B1 | 10/2001 | Yang .......................... 343/741 |
| 6,304,623 B1 | 10/2001 | Richards et al. ............ 375/355 |
| 6,374,155 B1 * | 4/2002 | Wallach et al. ............. 700/245 |
| 6,408,226 B1 * | 6/2002 | Byrne et al. ........... 318/568.11 |
| 6,421,389 B1 | 7/2002 | Jett et al. ..................... 375/256 |
| 2002/0000916 A1 * | 1/2002 | Richards .................. 340/572.1 |
| 2002/0095239 A1 * | 7/2002 | Wallach et al. ............. 700/245 |

OTHER PUBLICATIONS

Ciccimaro et al., A supervised autonomous security respinse robot, 1998, Internet, pp. 1–17.*
Falconer et al., Robot–mounted through–wall radar for detecting, locating, and identifying building occupants, 2000, IEEE, pp. 1868–1875.*
Nicoud, A demining technology project, 1996, IEEE, pp. 37–41.*

(List continued on next page.)

Primary Examiner—William A. Cuchlinski, Jr.
Assistant Examiner—McDieunel Marc
(74) Attorney, Agent, or Firm—William J. Tucker

(57) ABSTRACT

A system and method are described that use impulse radio technology to enhance the capabilities of a robot. In one embodiment, a system, a robot and a method are provided that use the communication capabilities of impulse radio technology to help a control station better control the actions of the robot. In another embodiment, a system, a robot and a method are provided that use the communication, position and/or radar capabilities of impulse radio technology to help a control station better control the actions of a robot in order to, for example, monitor and control the environment within a building.

18 Claims, 23 Drawing Sheets

OTHER PUBLICATIONS

Kellogg et al., The NRL mite air vehicle, 1996, Internet, pp. 1–13.*

Nomad 2000 robot, The intelligent service robot, 1999, Internet, pp. 1–4.*

Massios et al., Hierarchical decision–thoretic planning for autonomous robotic suveillance, 1999, IEEE, pp. 219–226.*

Shahri et al., Adaptive fuzzy force control oa an anti–personnel (AP) mine dtector robot, no date, Internet, pp. 0099–01040.*

Byrd, An intelligen inspection and survey robot, no date, Internet, pp. 1–8.*

Business Editors & High Tech Writers "Automated Identification Technologies Long Range Wireless ID Tags Add Powerful New Capabilities to Cybermotion's Automated Patrol Systems", Business Wire dated Dec. 14, 2000, 3 pages.

"Cybermotion CyberGuard Robotic Security System . . . ", downloaded Dec. 15, 2000 from http://www.cybermotion.com, 18 pages.

U.S. patent application Ser. No. 09/591,690, filed Jun. 12, 2000.

U.S. patent application Ser. No. 09/875,290, filed Jun. 7, 2001.

U.S. patent application Ser. No. 09/537,692, filed Mar. 29, 2000.

U.S. patent application Ser. No. 09/538,519, filed Mar. 29, 2000.

U.S. patent application Ser. No. 09/332,501, filed Jun. 14, 1999.

U.S. patent application Ser. No. 09/587,033, filed Jun. 2, 1999.

U.S. patent application Ser. No. 09/586,163, filed Jun. 2, 1999.

U.S. patent application Ser. No. 09/537,264, filed Mar. 29, 2000.

U.S. patent application Ser. No. 09/538,292, filed Mar. 29, 2000.

U.S. patent application Ser. No. 09/592,249, filed Jun. 12, 2000.

U.S. patent application Ser. No. 09/592,250, filed Jun. 12, 2000.

U.S. patent application Ser. No. 09/592,290, filed Jun. 12, 2000.

U.S. patent application Ser. No. 09/591,691, filed Jun. 12, 2000.

U.S. patent application Ser. No. 09/592,289, filed Jun. 12, 2000.

U.S. patent application Ser. No. 09/592,248, filed Jun. 12, 2000.

U.S. patent application Ser. No. 09/592,288, filed Jun. 12, 2000.

R.J. Fontana et al. "An Ultra Wideband Communication Link for Unmanned Vehicle Applications", Association for Unmanned Vehicle Systems International 1997 Conference (AUVSI '97), Baltimore, Jun. 3–6, 1997.

Multispectral Solutions Press Release Multispectral Solutions Develops First Ultra Wideband Radio to Exploit Ground Wave Propagation for Non Line–Of–Sight Applications, Dec. 2, 1997.

A. Valejo et al. "Short–Range DGPS for Mobile Robots with Wireless Ethernet Links", 1998 5th International Workshop on Advance Motion Control, pp. 334–339, 1998.

"Intelligent Taskable System Colonies for Small Unit Operations", USA Robotics Research Laboratory Report to DARPA, May 10–13, 1999.

G.S. Sukhatme et al. "Heterogeneous Robot Group Control and Applications", Proceedings of the AUVS 99 Conference, 1999.

G.S. Sukhatme et al. "Design and Implementation of a Mechanically Heterogeneous Robot Group", Proceedings of SPIE: Sens Fusion and Decentralized Control in Robotic Systems II, vol. 3839, pp. 122–133, Sep. 1999.

C.H. Spenny et al. "Closely Supervised Control of a Target–Steered UAV", Proceedings of SPIE, Telemanipulator and Telepresence Technologies VI, v 3840, pp. 179–190, 1999.

R.J. Fontana "Recent Applications of Ultra Wideband Radar and Communications Systems, in Ultra–Wideband Short–Pulse Electromagnetics"Kluwer Academic/Plenum Publishers, 2000.

Time Domain Corporation Press Release, "Time Domain Demonstrates Revolutionary Ultra Wideband (UWB) Technology at Roving Sands 2000", Jun. 20, 2000.

R.T. Vaughan et al. "Fly Spy: Lightweight Localization and Target Tracking for Cooperating Air and Ground Robots", Proc. Int. Symp. Distributed Autonomous Robot Systems, 2000.

G.S. Sukhatme et al. "Experiments with Cooperative Aerial–Ground Robots", in Robot Teams: From Diversity to Polymorphism, Eds. T. Balch and L.E. Parker, AK Peters, 2001 (possible prior art since not known exactly when published in 2001).

* cited by examiner

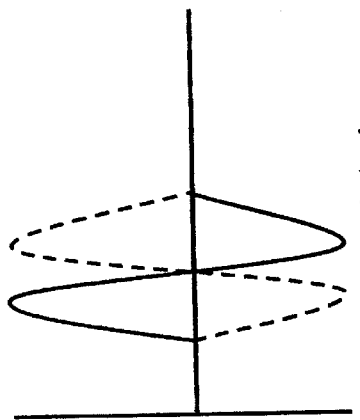
FIG. 4A Early – Late Modulation
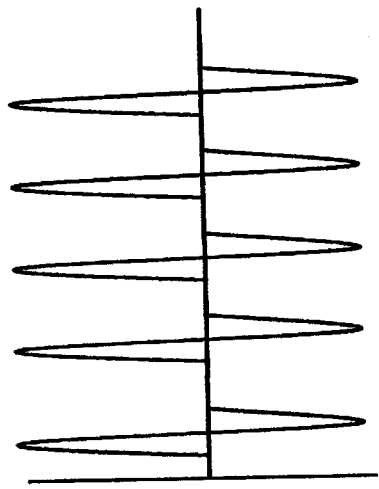
FIG. 4B One of Many Modulation
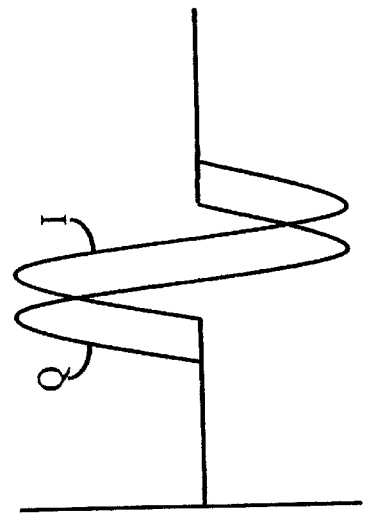
FIG. 4C Flip Modulation
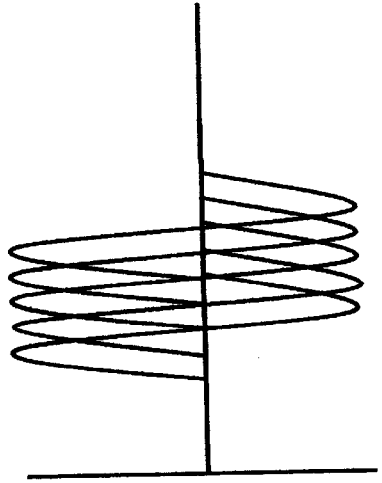
FIG. 4E Vector Modulation
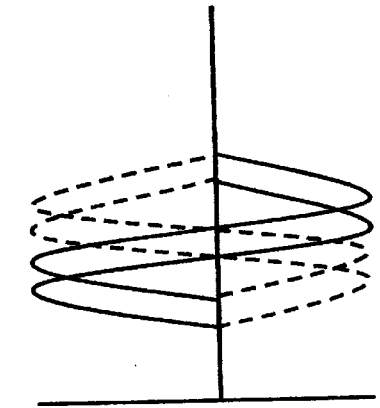
FIG. 4D Quad Flip Modulation

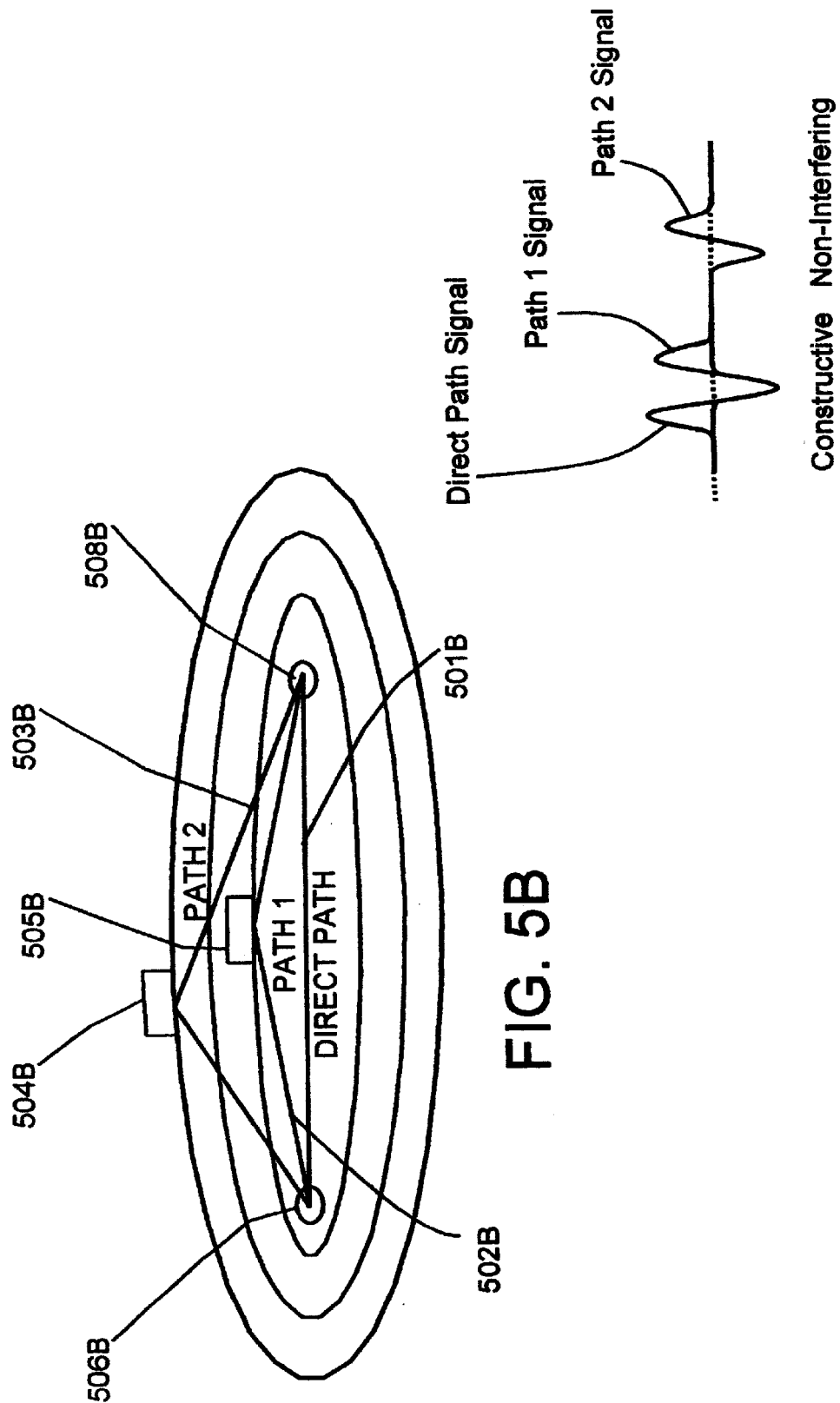

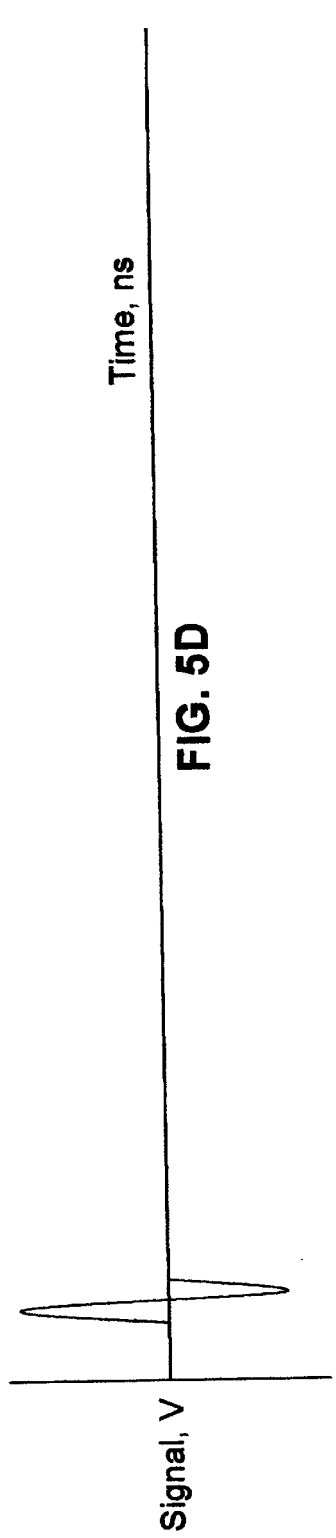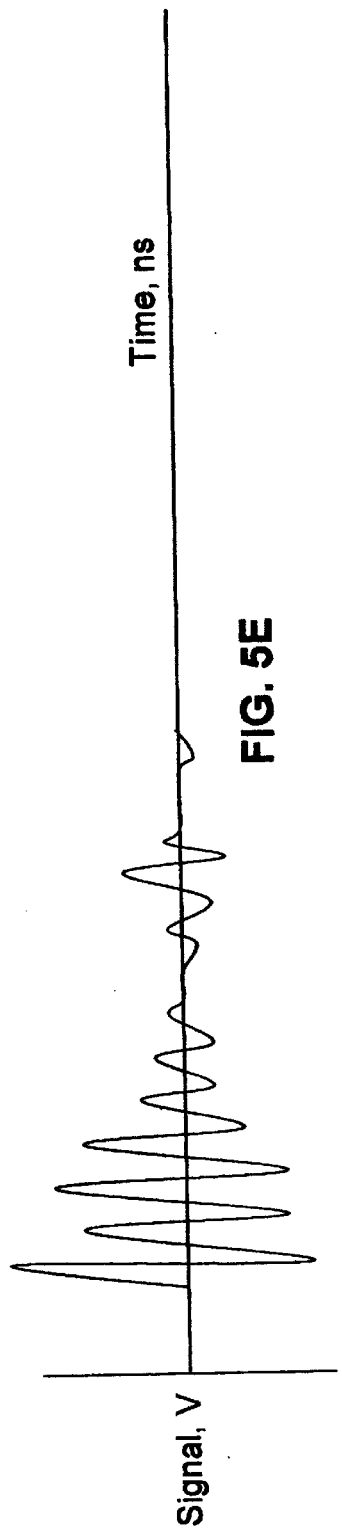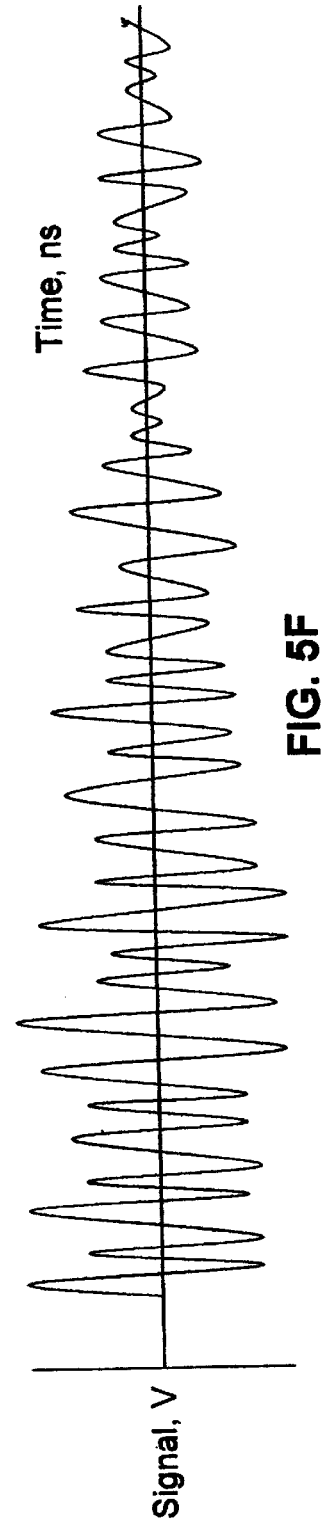

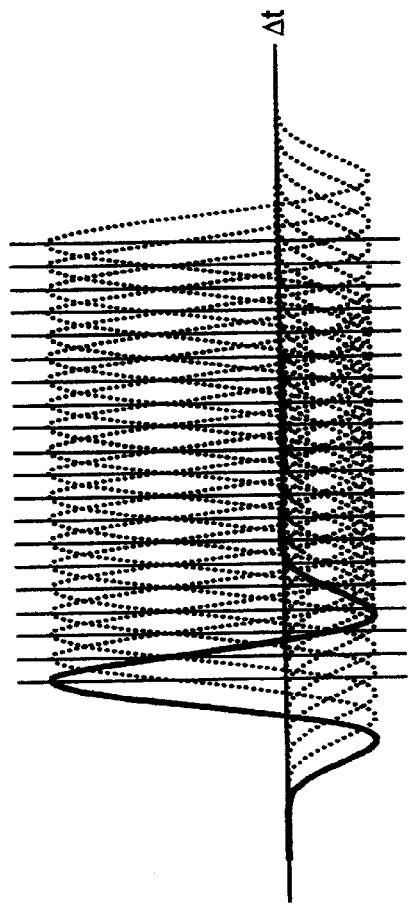
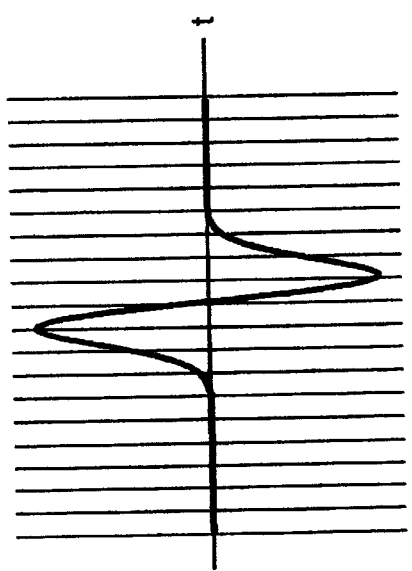
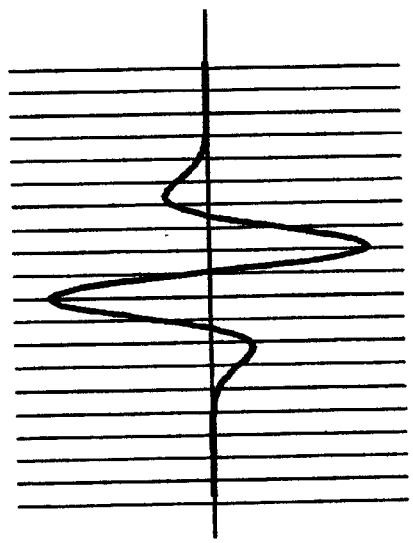
FIG. 8A
FIG. 8B
FIG. 8C

METHOD AND SYSTEM FOR CONTROLLING A ROBOT

BACKGROUND OF THE INVENTION

1. Field of the Invention

The present invention relates in general to robots and, in particular, to a system and method capable of using impulse radio technology to enhance the capabilities of a robot.

2. Description of Related Art

In the robotics field, one of the most significant design challenges involves the development of new ways to improve the way a control station can interact with and control the actions of a robot. To date many control stations have a standard radio transceiver, which transmits and receives radio signals to and from another standard radio transceiver attached to the robot in order to interact with and control the actions of that robot. Unfortunately, problems have arisen in the past with the use of standard radio equipment because there are often problematical "dead zones" within a building that may interfere with the communications between the control station and a moving robot. Dead zones are caused by the closed structure of the building, which can make it difficult for a moving robot using a standard radio transceiver to maintain contact with a control station using a standard radio transceiver. For instance, the standard radio signals sent from the standard radio transceiver attached to the control station may not be able to penetrate a certain wall or floor within the building and as such may not reach the standard radio transceiver attached to the moving robot.

The closed structure of the building may also cause "multipath interference" which can interfere with standard radio transmissions between the control station and the robot. Multipath interference is an error caused by the interference of a standard radio signal that has reached a standard radio receiver by two or more paths. For instance, the standard radio receiver attached to the robot may not be able to demodulate a received radio signal because the originally transmitted radio signal effectively cancels itself out by bouncing of walls and floors of the building before reaching the robot. Accordingly, there has been a need to provide a system, robot and method that can overcome the traditional shortcomings associated with communications between the control station and robot. This need and other needs are addressed by the system, robot and method of the present invention.

BRIEF DESCRIPTION OF THE INVENTION

The present invention includes a system and method capable of using impulse radio technology to enhance the capabilities of a robot. In one embodiment of the present invention, a system, a robot and a method are provided that use the communication capabilities of impulse radio technology to help a control station better control the actions of the robot. In another embodiment of the present invention, a system, a robot and a method are provided that use the communication, position and/or radar capabilities of impulse radio technology to help a control station better control the actions of a robot in order to, for example, monitor and control the environment within a building.

BRIEF DESCRIPTION OF THE DRAWINGS

A more complete understanding of the present invention may be had by reference to the following detailed description when taken in conjunction with the accompanying drawings wherein:

FIGS. 4A–4E graphically illustrate five modulation techniques to include: Early-Late Modulation; One of Many Modulation; Flip Modulation; Quad Flip Modulation; and Vector Modulation;

FIG. 5B depicts a typical geometrical configuration giving rise to multipath received signals;

FIG. 5C illustrates exemplary multipath signals in the time domain;

FIGS. 5D–5F illustrate a signal plot of various multipath environments.

FIG. 8A illustrates a representative received pulse signal at the input to the correlator;

FIG. 8B illustrates a sequence of representative impulse signals in the correlation process;

FIG. 8C illustrates the output of the correlator for each of the time offsets of FIG. 8B.

DETAILED DESCRIPTION OF THE INVENTION

Figure 1B:
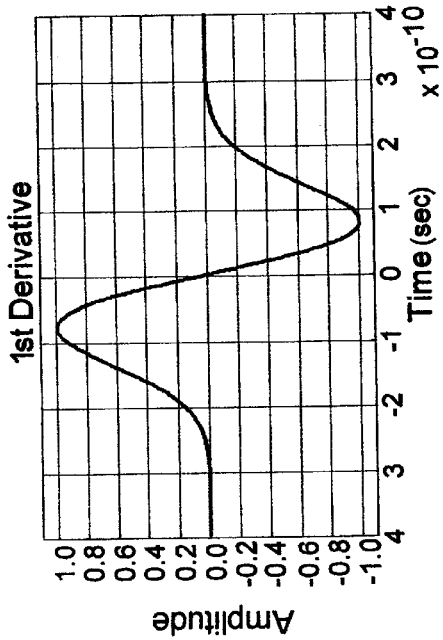
FIG. 1B illustrates the frequency domain amplitude of the Gaussian Monocycle of FIG. 1A.
Figure 1D:
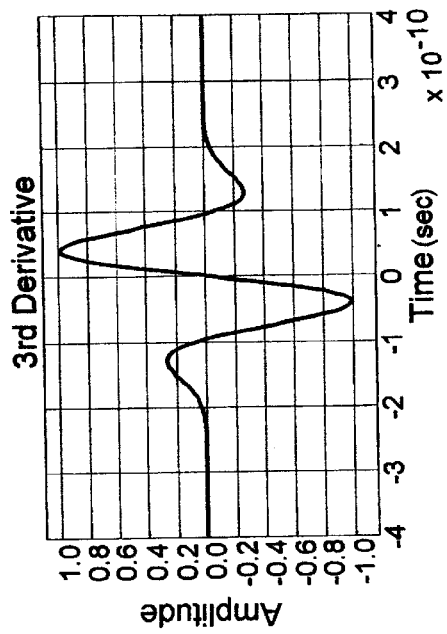
FIG. 1D represents the third derivative of the Gaussian Monocycle of FIG. 1A.
Figure 1A:
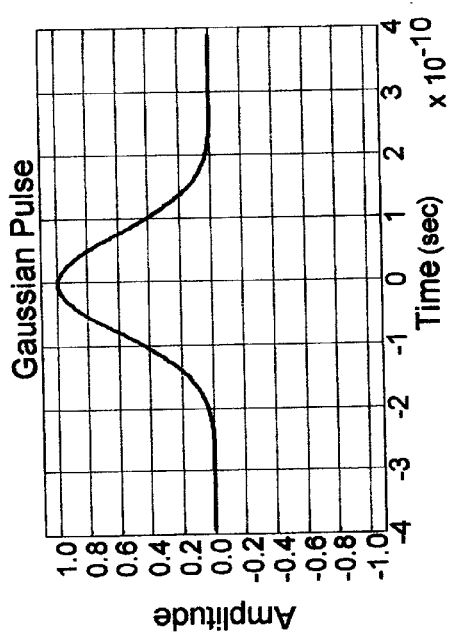
FIG. 1A illustrates a representative Gaussian Monocycle waveform in the time domain.
Figure 1C:
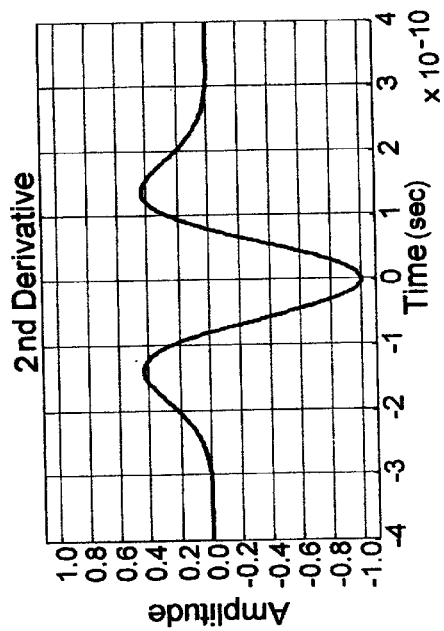
FIG. 1C represents the second derivative of the Gaussian Monocycle of FIG. 1A.

The present invention includes a system and method capable of using impulse radio technology to enhance the capabilities of a robot. The use of impulse radio technology to enhance the capabilities of a robot is a significant improvement over the state-of-art. This significant improvement over the state-of-art is attributable, in part, to the use of an emerging, revolutionary ultra wideband technology (UWB) called impulse radio communication technology (also known as impulse radio).

Impulse radio, which is not a continuous wave carrier-based system, has been described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents includes U.S. Pat. Nos. 5,677,927 (issued Oct. 14, 1997), 5,687,169 (issued Nov. 11, 1997), 5,764,696 (issued Jun. 9, 1998), and 5,832,035 (issued Nov. 3, 1998) to Fullerton et al.

Uses of impulse radio systems are described in U.S. Pat. No. 6,177,903 entitled, "System and Method for Intrusion Detection using a Time Domain Radar Array" and U.S. Pat. No. 6,218,979 entitled, "Wide Area Time Domain Radar Array" both of which are assigned to the assignee of the present invention. These patents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very, broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
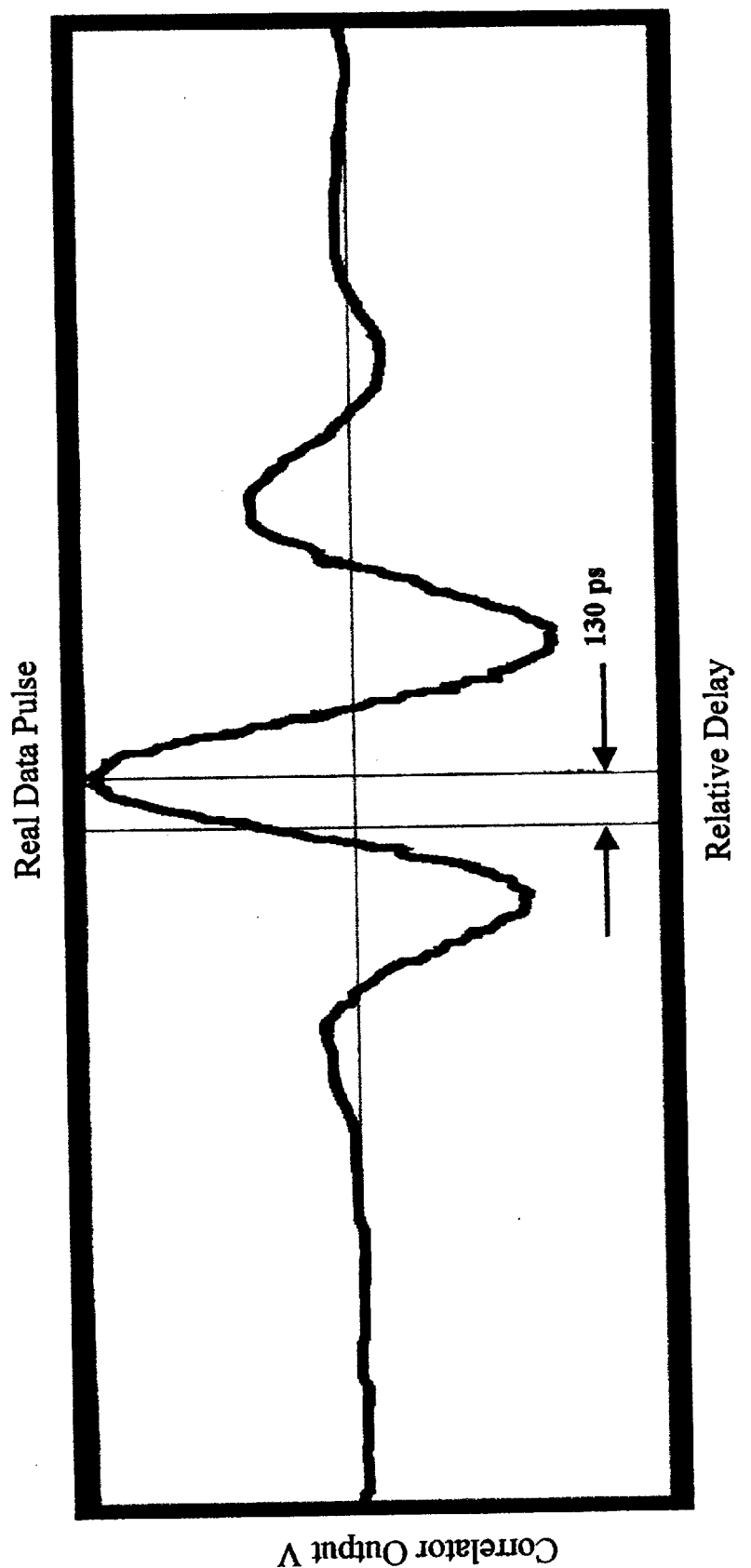
FIG. 1E represents the Correlator Output vs. the Relative Delay in a real data pulse.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where $\sigma$ is a time scaling parameter, t is time, and e is the natural logarithm base.

Figure 1F:
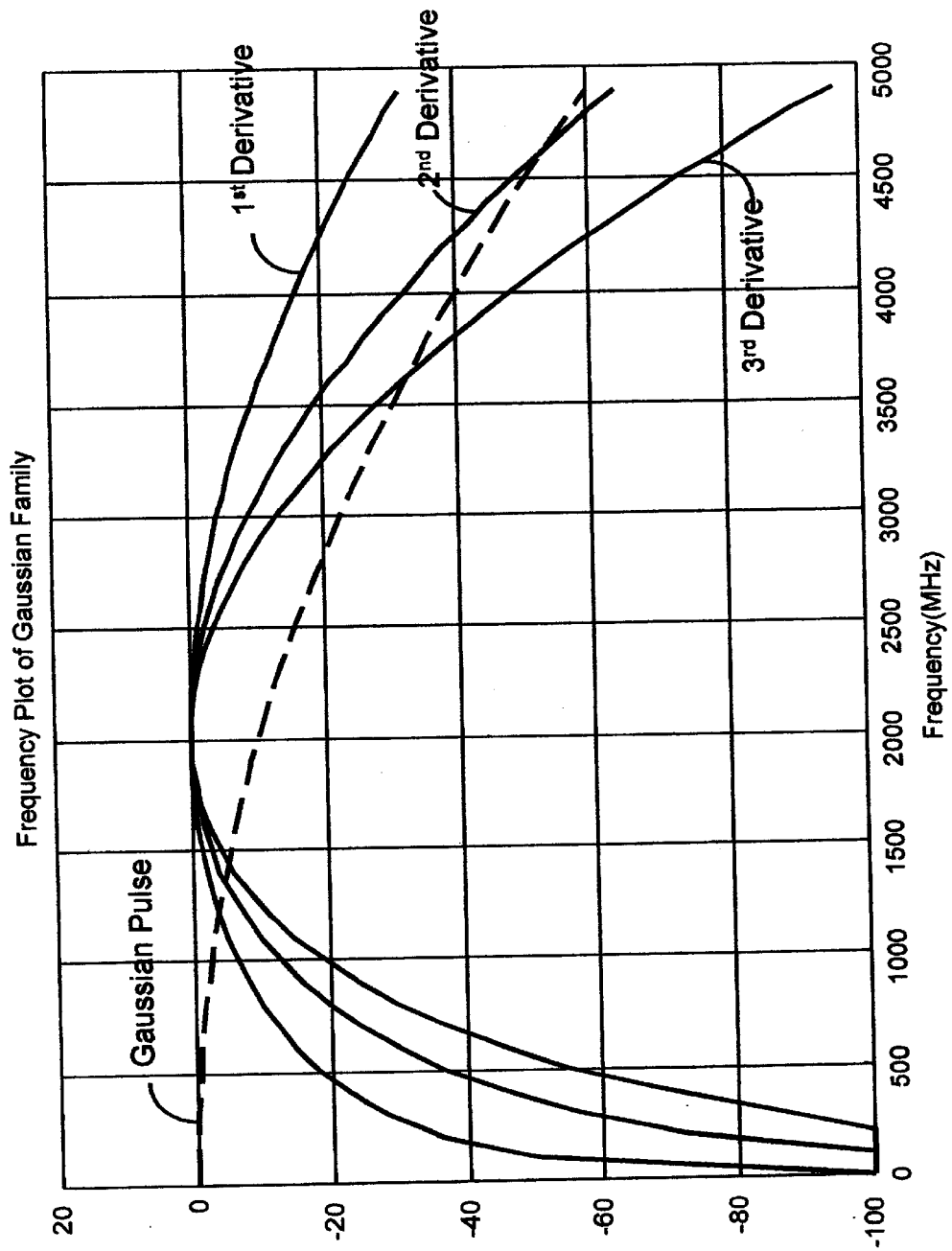
FIG. 1F graphically depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$), or frequency of peak spectral density, of the Gaussian monocycle is:

$$f_c = \frac{1}{2\pi\sigma}$$

It should be noted that the output of an ultra-wideband antenna is essentially equal to the derivative of its input. Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Pulse Trains

Figure 2A:
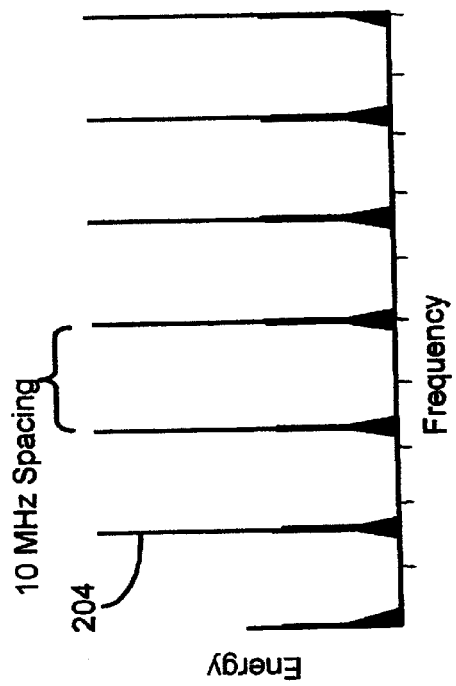
FIG. 2A illustrates a pulse train comprising pulses as in FIG. 1A.
Figure 2B:
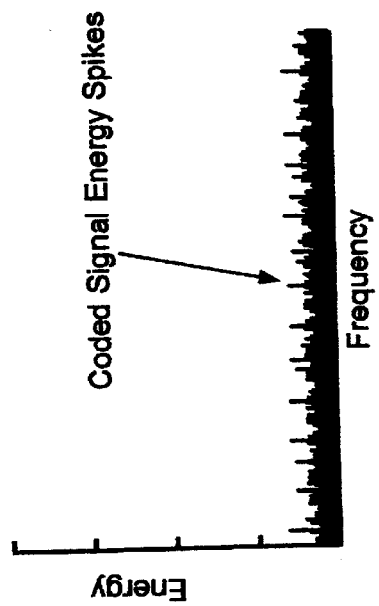
FIG. 2B illustrates the frequency domain amplitude of the waveform of FIG. 2A.
Figure 2C:
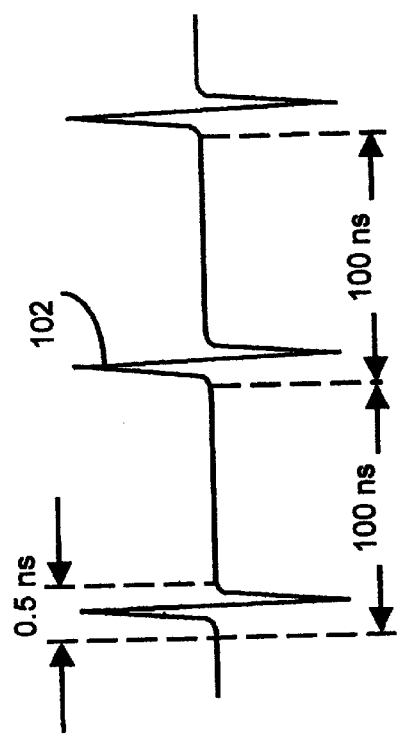
FIG. 2C illustrates the pulse train spectrum.

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, $\omega(t,b)$ is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left|\sum_{i=1}^{n} \frac{e^{j\Delta t}}{n}\right|$$

where $A(\omega)$ is the amplitude of the spectral response at a given frequency□□ω□ is the frequency being analyzed ($2\pi f$), $\Delta t$ is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobeto-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Figure 2D:
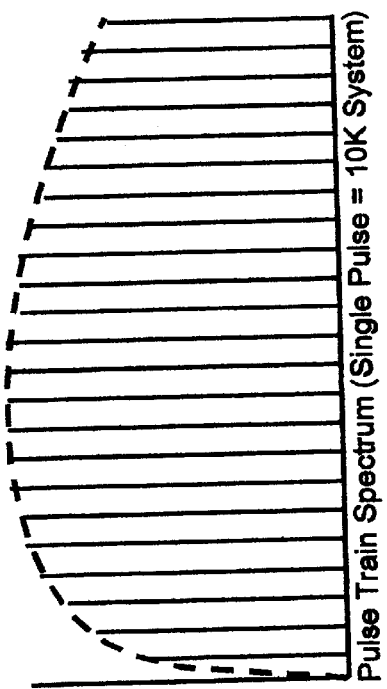
FIG. 2D is a plot of the Frequency vs. Energy Plot and points out the coded signal energy spikes.

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
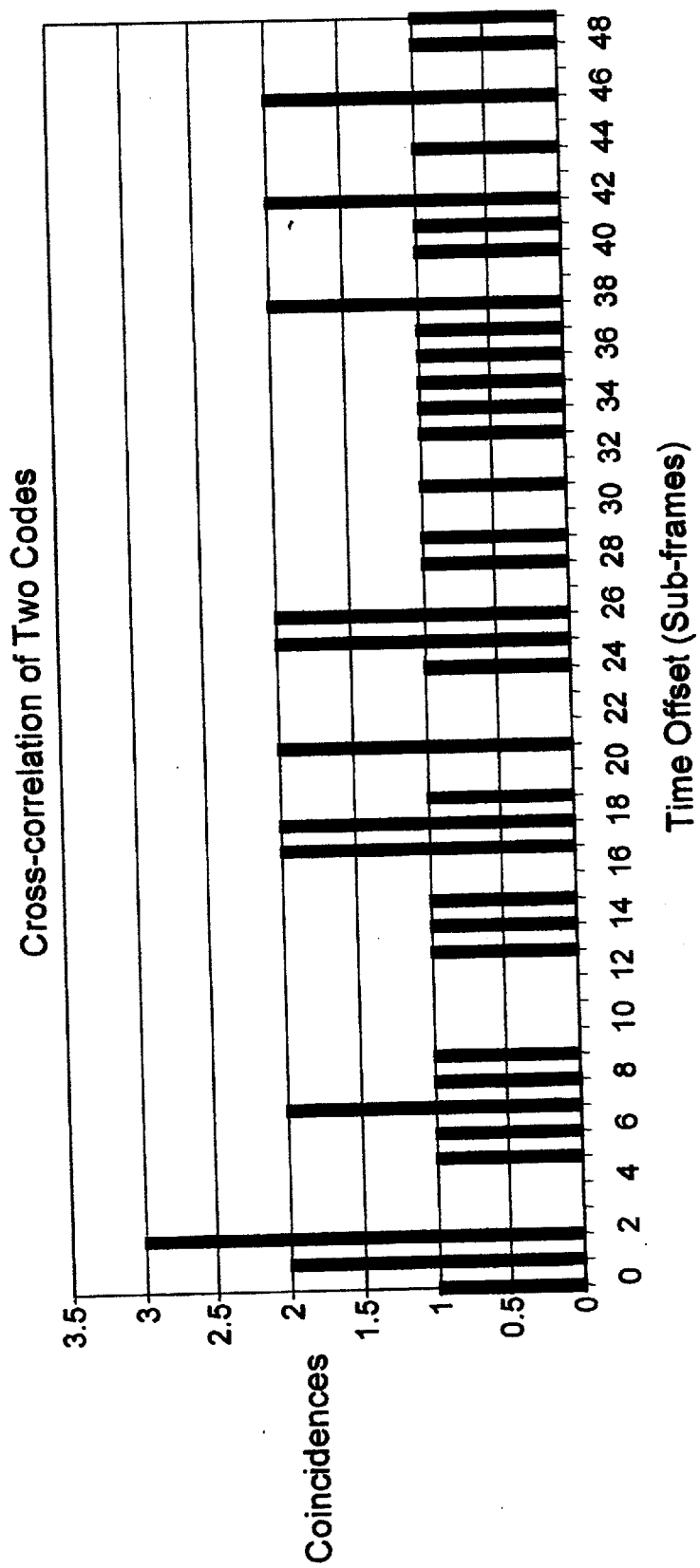
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$s_{tr}^{(k)}(t) = \sum_j (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)^{f_j^{(k)}}$, $a_j^{(k)}$, $b_j^{(k)}$, $c_j^{(k)}$, and $\omega(t, b_j^{(k)})$ are the coded polarity, pulse amplitude, pulse type, pulse width, and normalized pulse waveform of the jth pulse of the kth transmitter, and $T_j^{(k)}$ is the coded time shift of the jth pulse of the kth transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register (s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A pulse train with conventional 'early-late' time-shift modulation can be expressed:

$$s_{tr}^{(k)}(t) = \sum_j (-1)^{f_j^{(k)}} a_j^{(k)} \omega(c_j^{(k)} - T_j^{(k)} - \delta d_{[j/N_s]}^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t,b_j^{(k)})$ are the coded polarity, pulse amplitude, pulse type, pulse width, and normalized pulse waveform of the jth pulse of the kth transmitter, $T_j^{(k)}$ is the coded time shift of the jth pulse of the kth transmitter, d is the time shift added when the transmitted symbol is 1 (instead of 0), $d^{(k)}$ is the data (i.e., 0 or 1) transmitted by the kth transmitter, and $N_s$ is the number of pulses per symbol (e.g., bit). Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," U.S. patent application Ser. No. 09/875,290, filed Jun. 7, 2001, assigned to the assignee of the present invention, and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
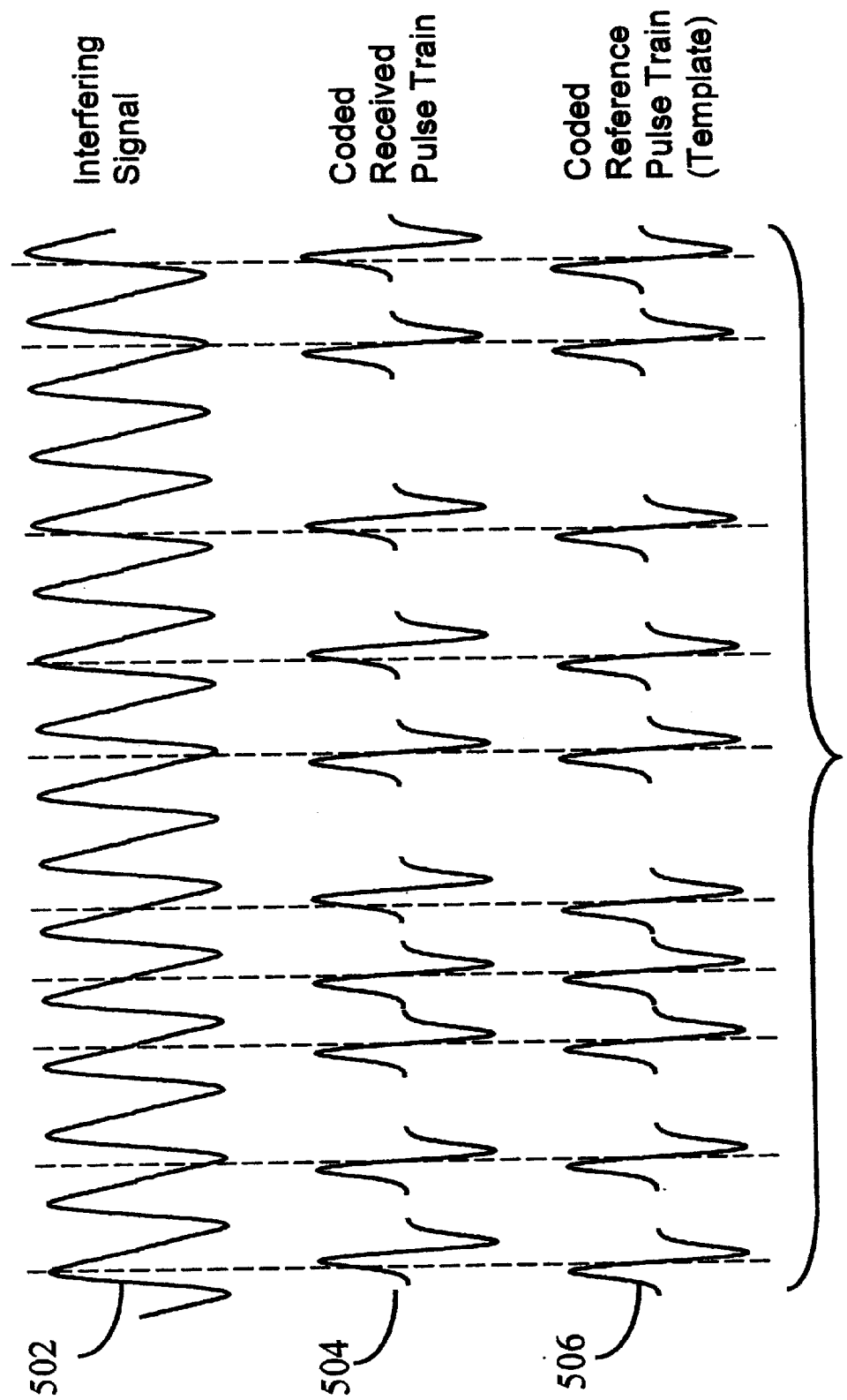
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t - \delta)]dt$$

and $$\sigma_a^2 = T_f^{-1} \int_{-\infty}^{\infty} \left[\int_{-\infty}^{\infty} \omega(t-s)v(t)dt\right]^2 ds,$$

where $\omega(t)$ is the monocycle waveform, $v(t)=\omega(t)-\omega(t-\delta)$ is the template signal waveform, $\delta$ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

Figure 5G:
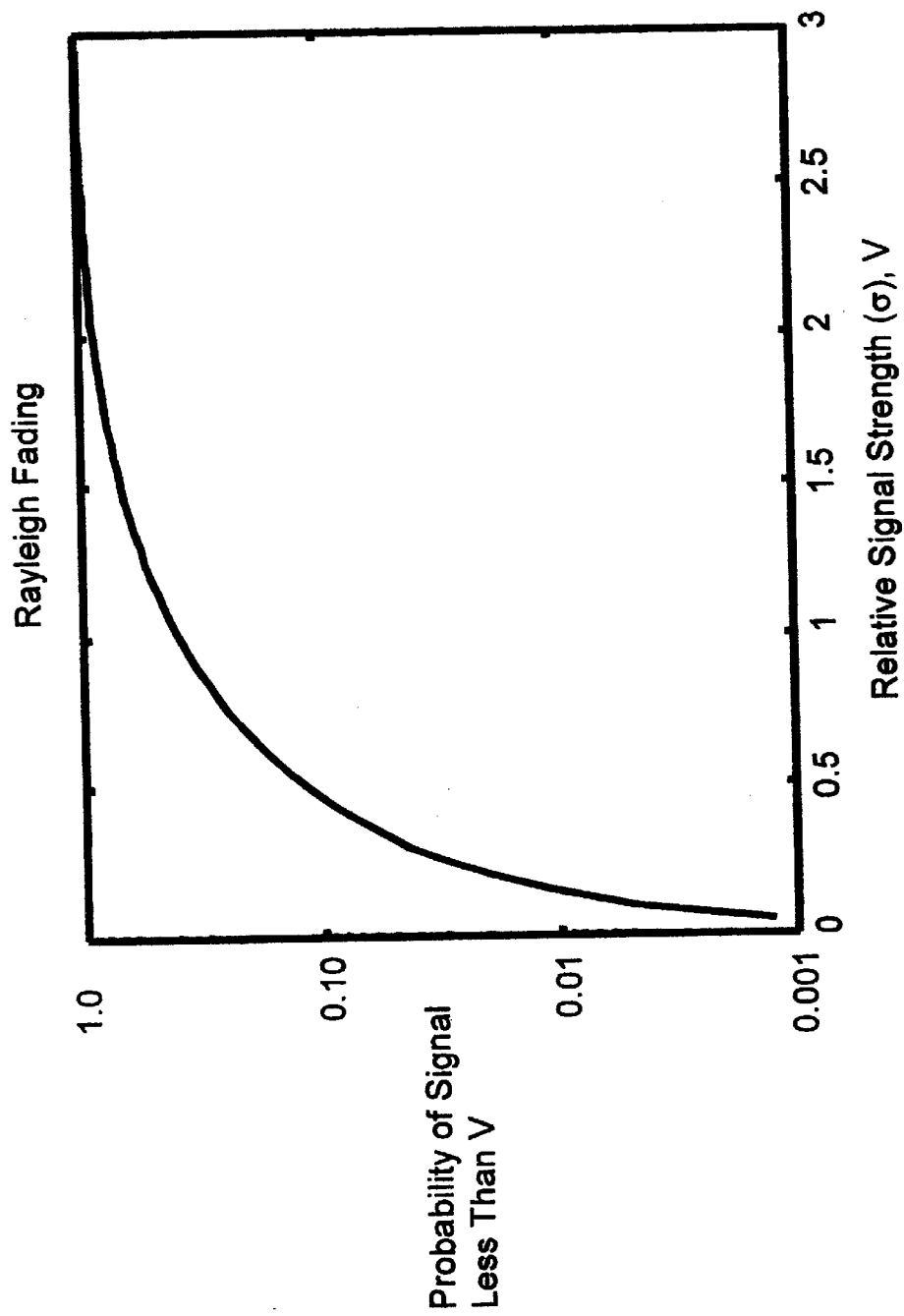
FIGS. 5G illustrates the Rayleigh fading curve associated with non-impulse radio transmissions in a multipath environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 5B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $s(2)^{1/2}$ is the RMS power of the combined multipath signals. The Rayleigh distribution curve in FIG. 5G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5H:
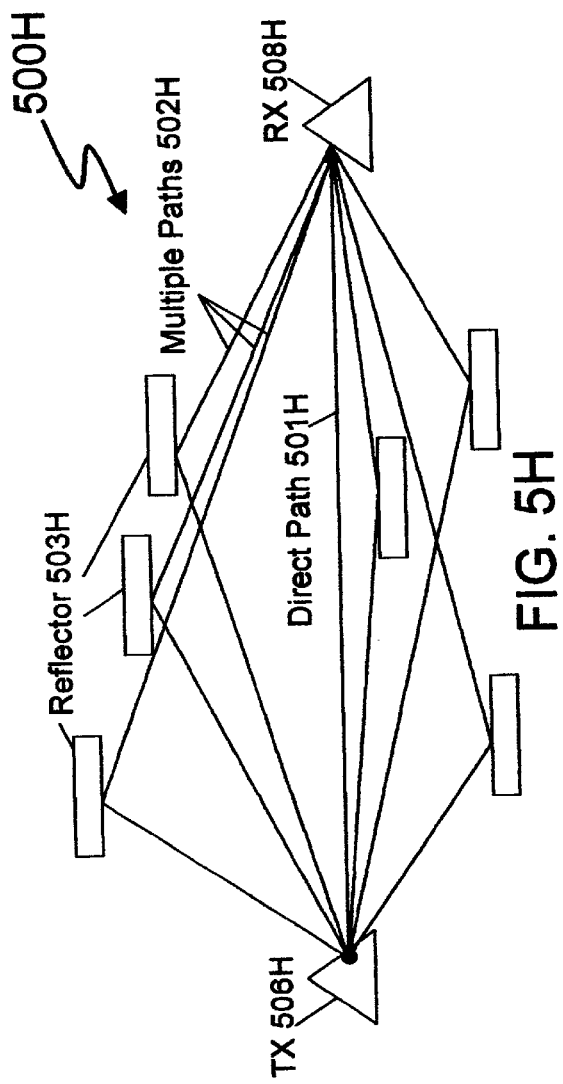
FIG. 5H illustrates a plurality of multipaths with a plurality of reflectors from a transmitter to a receiver.
Figure 5I:
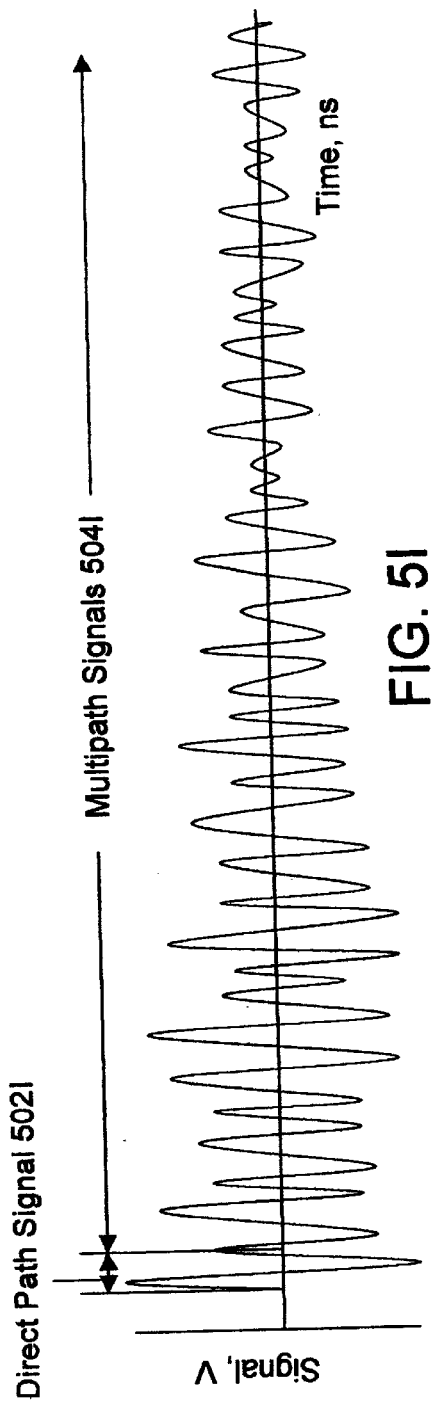
FIG. 5I graphically represents signal strength as volts vs. time in a direct path and multipath environment.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIG. 5H and 5I. FIG. 5H depicts an impulse radio system in a high multipath environment 500H consisting of a transmitter 506H and a receiver 508H. A transmitted signal follows a direct path 501H and reflects off reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. In the same manner described earlier for FIGS. 5B and 5C, the direct path signal 502I is sampled, while the multipath signals 504I are not, resulting in Rayleigh fading avoidance.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has no multi-cycle ambiguity, it is possible to determine waveform position to less than a wavelength, potentially down to the noise floor of the system. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method is described in co-owned, co-pending U.S. Pat. No. 6,300,903 entitled "System and Method for Person or Object Position Location Utilizing Impulse Radio," which is incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of impulse radio power control, see patent application titled "System and Method for Impulse Radio Power Control," application Ser. No. 09/332, 501, filed Jun. 14, 1999, assigned to the assignee of the present invention, and incorporated herein by reference.

Mitigating Effects of Interference

A method for mitigating interference in impulse radio systems comprises the steps of conveying the message in packets, repeating conveyance of selected packets to make up a repeat package, and conveying the repeat package a plurality of times at a repeat period greater than twice the period of occurrence of the interference. The communication may convey a message from a proximate transmitter to a distal receiver, and receive a message by a proximate receiver from a distal transmitter. In such a system, the method comprises the steps of providing interference indications by the distal receiver to the proximate transmitter, using the interference indications to determine predicted noise periods, and operating the proximate transmitter to convey the message according to at least one of the following: (1) avoiding conveying the message during noise periods, (2) conveying the message at a higher power during noise periods, (3) increasing error detection coding in the message during noise periods, (4) re-transmitting the message following noise periods, (5) avoiding conveying the message when interference is greater than a first strength, (6) conveying the message at a higher power when the interference is greater than a second strength, (7) increasing error detection coding in the message when the interference is greater than a third strength, and (8) re-transmitting a portion of the message after interference has subsided to less than a predetermined strength.

For greater elaboration of mitigating interference in impulse radio systems, see the patent application titled "Method for Mitigating Effects of Interference in Impulse Radio Communication," application Ser. No. 09/587,033, filed Jun. 2, 1999, assigned to the assignee of the present invention, and incorporated herein by reference.

Moderating Interference in Equipment Control Applications

Yet another improvement to impulse radio includes moderating interference with impulse radio wireless control of an appliance. The control is affected by a controller remote from the appliance which transmits impulse radio digital control signals to the appliance. The control signals have a transmission power and a data rate. The method comprises the steps of establishing a maximum acceptable noise value for a parameter relating to interfering signals and a frequency range for measuring the interfering signals, measuring the parameter for the interference signals within the frequency range, and effecting an alteration of transmission of the control signals when the parameter exceeds the maximum acceptable noise value.

For greater elaboration of moderating interference while effecting impulse radio wireless control of equipment, see patent application titled "Method and Apparatus for Moderating Interference While Effecting Impulse Radio Wireless Control of Equipment," application Ser. No. 09/586,163, filed Jun. 2, 1999, and assigned to the assignee of the present invention, and incorporated herein by reference.

Exemplary Transceiver Implementation

Transmitter

Figures 6, 7:
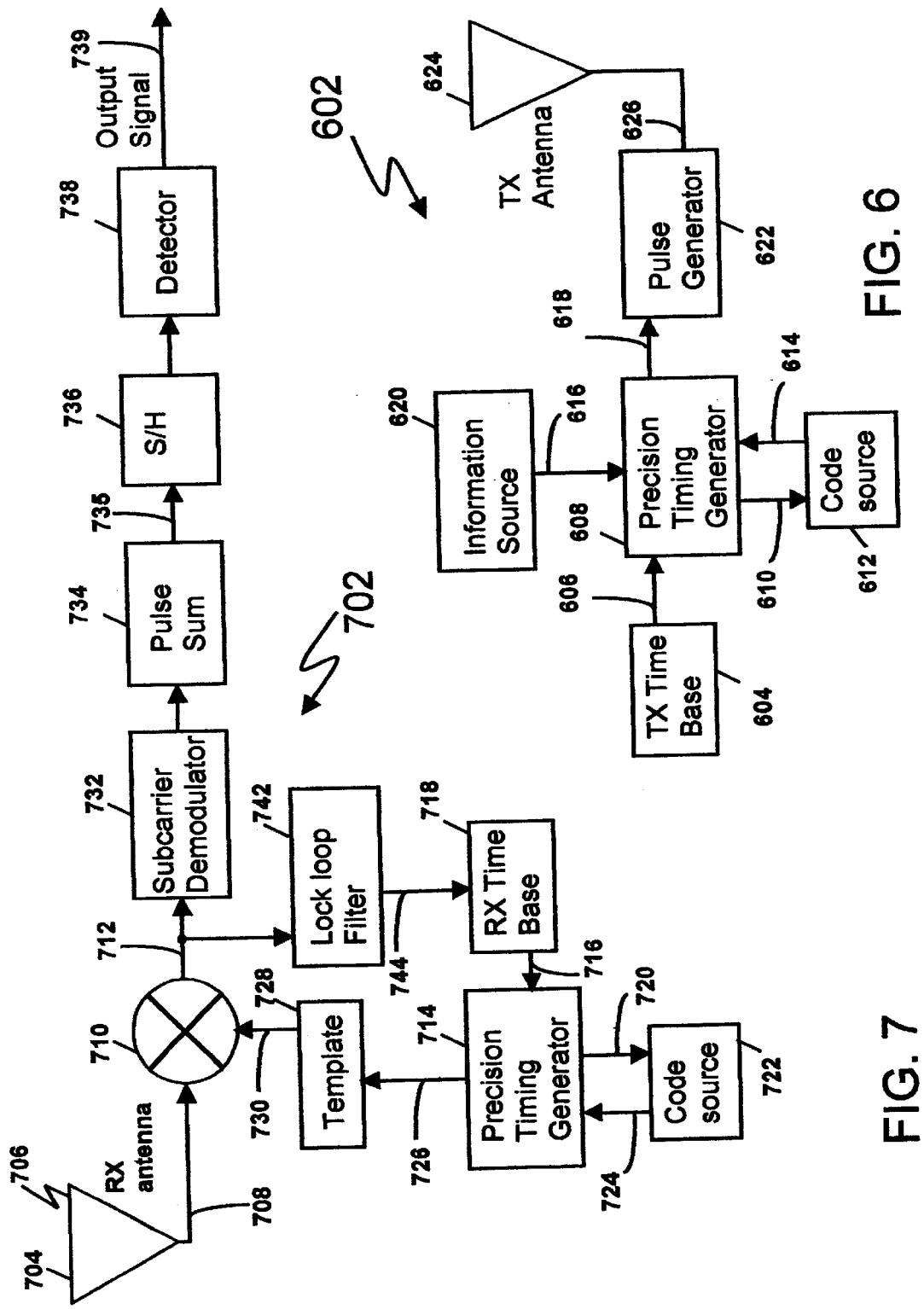
FIG. 6 illustrates a representative impulse radio transmitter functional diagram.
FIG. 7 illustrates a representative impulse radio receiver functional diagram.

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses are called the emitted signal, and propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio commmunication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 is coupled to a subcarrier demodulator 732, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to position in time the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. SB shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point that is applicable on this graph. This is the point corresponding to the time offset of the template signal used to receive that pulse. Further examples and details of precision timing can be found described in U.S. Pat. Nos. 5,677,927 and 6,304,623 both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see U.S. Pat. No. 6,421,389 entitled "Baseband Signal Converter for a Wideband Impulse Radio Receiver," which is assigned to the assignee of the present invention, and incorporated herein by reference.

Preferred Embodiments of the Present Invention

Referring to FIGS. 9–25, there are disclosed several embodiments of an exemplary system 900, an exemplary robot 902 and preferred method 1300 in accordance with the present invention. Although the present invention is described as using impulse radio technology, it should be understood that the present invention can be used with any type of ultra wideband technology, but is especially suited for use with time-modulated ultra wideband technology. Accordingly, the system 900, the robot 902 and the preferred method 1300 should not be construed in a limited manner.

Figure 9:
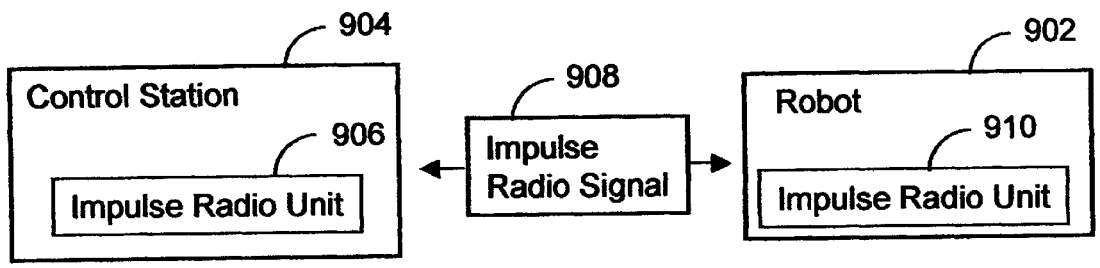
FIG. 9 is a diagram illustrating the basic components of a system in accordance with the present invention.

Referring to FIG. 9, there is a diagram illustrating the basic components of the system 900 in accordance with the present invention. The system 900 includes a control station 904 that has a first impulse radio unit 906 which operates to transmit and receive impulse radio signals 908 to and from a second impulse radio unit 910 attached to the robot 902 (only one shown). The impulse radio signals 908 convey information using a known pseudorandom sequence of pulses that look like a series of Gaussian waveforms (see FIGS. 1–3). As described in greater detail below, the control station 904 can effectively control the actions of the robot 902 by using the information within in the impulse radio signals 908 transmitted to and receive from the robot 902. In particular, the control station 904 and robot 902 can use impulse radio technology and the information within in the impulse radio signals 908 to effectively monitor and control, if needed, the environment within a building (other applications are described below). To accomplish these tasks, the control station 904 and robot 902 utilize the revolutionary and highly scalable communication capabilities, position capabilities (optional) and radar capabilities (optional) of impulse radio technology.

In other words, the control station 904 and robot 902 can use impulse radio signals 908 to transmit and receive information to and from one another in places and situations not possible with standard radio signals. Again, the conventional radio technology used to transmit and receive radio signals between a control station and robot within a building suffer from the adverse affects of "dead zones" and "multipath interference". Dead zones in a building make it difficult for a control station to maintain contact with a moving robot using standard radio signals. For instance, the standard radio signals sent from the standard radio transceiver attached to the control station may not be able to penetrate a certain wall or floor within the building and as such may not reach the standard radio transceiver attached to the moving robot. Fortunately in the present invention, the impulse radio signals 908 transmitted between a robot 902 and control station 904 are located very close to DC which makes the attenuation due to walls and floors minimal when compared to standard radio signals.

In addition, "multipath interference" which is very problematic within the closed structure of a building can be caused by the interference of a standard radio signal that has reached either the traditional robot or traditional control station by two or more paths. Essentially, a standard radio receiver attached to a robot may not be able to demodulate a radio signal because the originally transmitted radio signal effectively cancels itself out by bouncing of walls and floors of the building before reaching the robot and vice versa. The present invention is not affected by "multipath interference" because the impulses of the impulse radio signals 908 delayed by multipath reflections typically arrive outside a correlation (or demodulation) period of the receiving impulse radio unit.

Moreover, traditional control stations use either standard radio or infrared electromagnetic waves to transfer data to and from a traditional robot. However, these traditional communication means impose undesirable limits on range, data rate and communication quality. For instance, traditional wireless communication technologies suffer from the following undesirable characteristics:

A limited spectral bandwidth.

A shared broadcast medium.

Are unprotected from outside signals.

In contrast, the use of impulse radio technology in the present invention provides many advantages over traditional wireless communication technologies including, for example, the following:

Ultra-short duration pulses which yield ultrawide bandwidth signals.

Extremely low power spectral densities.

Excellent immunity to interference from other radio systems.

Consumes substantially less power than conventional radios.

Capable of high bandwidth and multi-channel performance.

Figure 10:
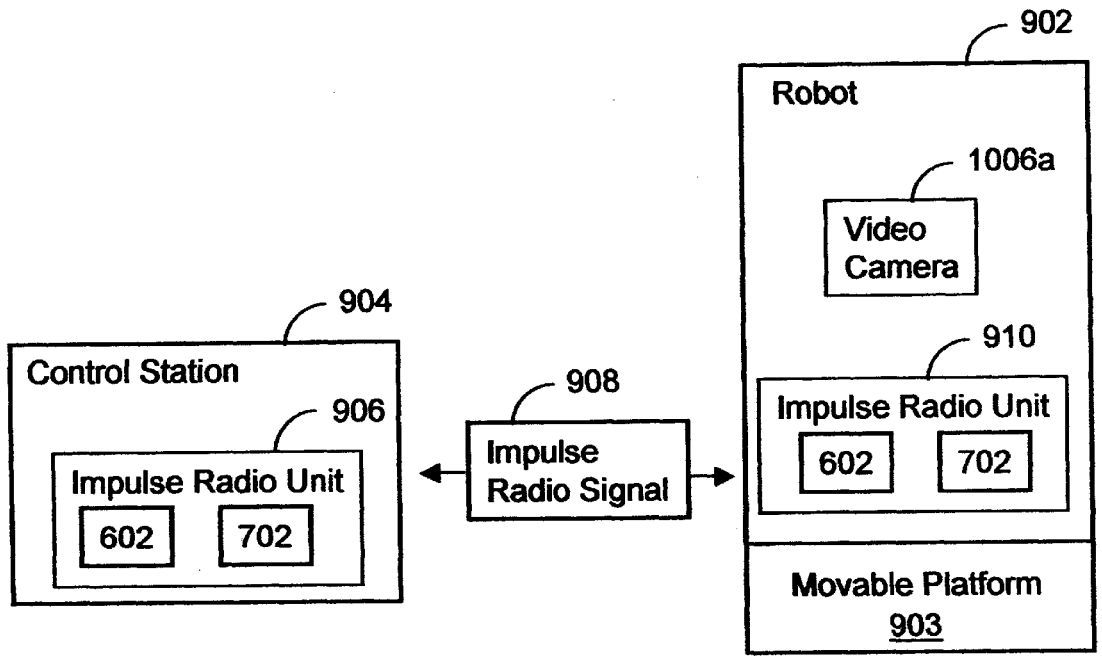
FIG. 10 is a diagram illustrating in greater detail the components of a robot and control station of the system shown in FIG. 9.

Referring to FIG. 10, there is a diagram illustrating in greater detail the components of the control station 904 and the robot 902 shown in FIG. 9. As illustrated, the control station 904 incorporates the first impulse radio unit 906 and the robot 902 incorporates the second impulse radio unit 910. Each impulse radio unit 906 and 910 can be configured as a transceiver and include a receiving impulse radio unit 602 and a transmitting impulse radio unit 702 (see FIGS. 6 and 7). In the alternative, the impulse radio units 906 and 910 can be configured as a receiver or transmitter depending on the functional requirements of the control station 904 and robot 902. For instance, the robot 902 may only need to download operating instructions and, as such, the first impulse radio unit 906 could be a transmitting impulse radio unit and the second impulse radio unit 910 would be a receiving impulse radio unit. Again, the control station 904 and robot 902 use impulse radio signals 908 to transmit and receive information to and from one another in places and situations not possible with standard radio signals.

In addition to enabling communications between the robot 902 and the control station 904, impulse radio technology can also enable the control station 904 to track the position of the robot 902 which has a movable platform 903. Of course, a control station 904 that knows the current position of a robot 902 can better control the actions of that robot 902. To determine the current position of the robot 902, the impulse radio unit 910 associated with the robot 902 interacts with one or more reference impulse radio units 1002 (see FIG. 11) such that either the robot 902, the control station 904, or one of the reference impulse radio units 1002 can calculate the current position of the robot 902. How the impulse radio units 906 and 910 interact with one another to determine the position of the robot 902 can best be understood by referring to the description associated with FIGS. 11 and 14–25.

The robot 902 may also carry one or more sensors 1006. For instance, the sensor 1006 could be a video camera 1006a that can obtain information in video form about the area surrounding the robot 902. This video information can then be transmitted to the control station 904 using the impulse radio unit 910 which modulates and forwards the information using high bandwidth impulse radio signals 908. As will be described in greater detail below with respect to FIG. 11, there can be a wide variety of sensors 1006 that can interact with and be controlled by the remote control station 904 in order to effectively monitor and control, if need, the environment within a building.

Figure 11:
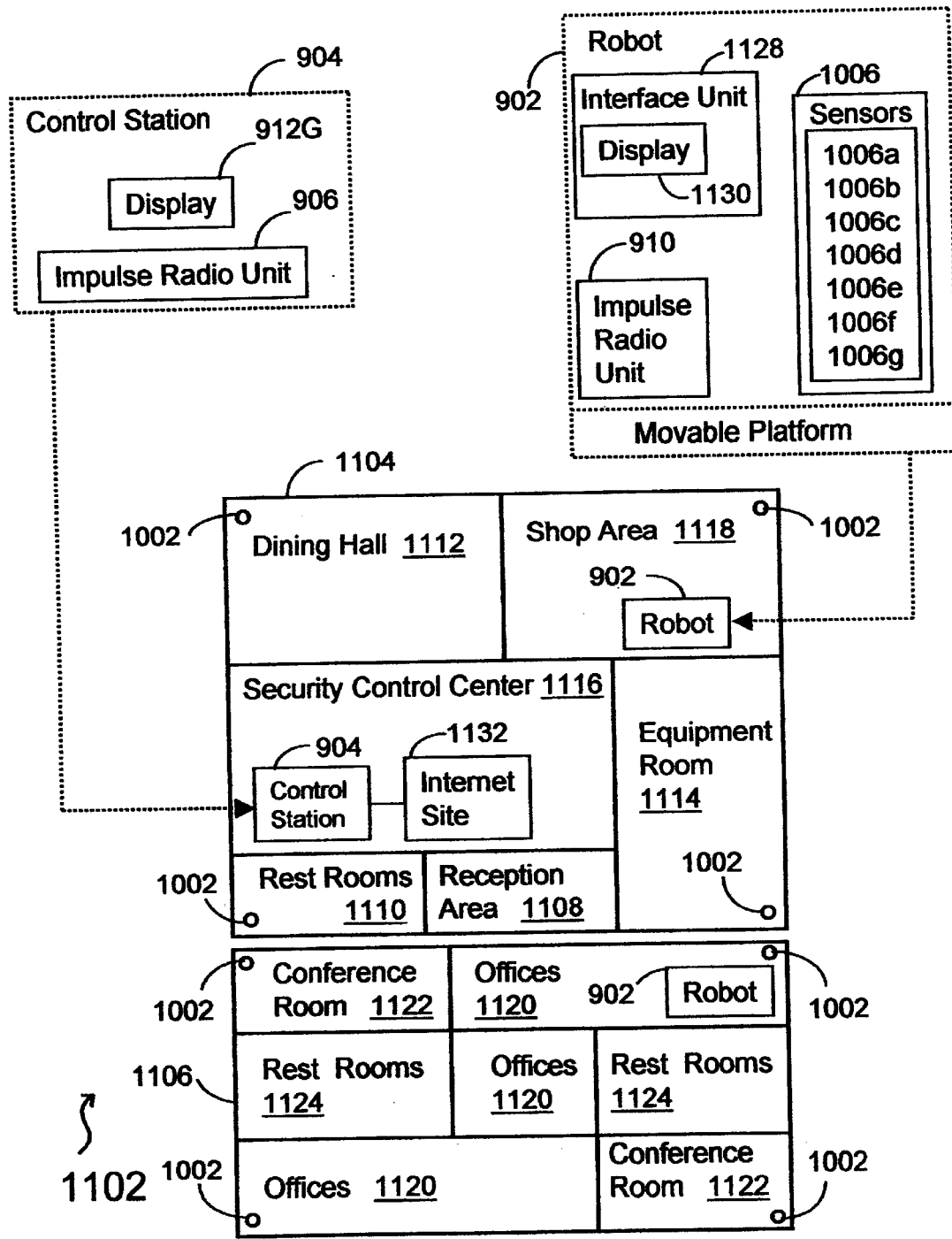
FIG. 11 is a diagram illustrating the robot and control station of FIG. 10 used in a manner to monitor and control, if needed, the environment within a building.

Referring to FIG. 11, there is a diagram illustrating the robot 902 and control station 904 of FIG. 10 that can be used in a manner to monitor and control, if needed, the environment within a building 1102. As illustrated, the building 1102 (shown as an industrial facility) includes a first floor 1104 and a second floor 1106. The first floor 1104 can include a reception area 1108, restrooms 1110, dining hall 1112, equipment room 1114, security control center 1116 and a shop area 1118. The second floor 1106 can includes a series of offices 1120, conference room 1122 and restrooms 1124. Of course, the illustrated layout of the building 1102 is for purposes of discussion only and is not intended as a limitation to the present invention.

The robot 902 includes one or more sensors 1006 that are remotely controlled by the control station 904 in a manner that allows one to monitor and control, if needed, the environment within a building 1102. The sensors 1006 can have many functions and can use many different techniques to obtain sensor related information which is eventually modulated and forwarded in the impulse radio signals 908 towards the control station 904 (see FIG. 9). For instance, the sensor 1006 can take the form of a thermostat 1006a which can be used to monitor and control the temperature in a particular area of the building 1102 where the robot 902 happens to be located. In this case, the sensor 1006a and the impulse radio unit 910 would operate together to transmit an impulse radio signal 908 having a known pseudo-random sequence of pulses that look like a series of Gaussian waveforms (see FIGS. 1–3) that convey environmental related information towards the impulse radio unit 906 attached to the control station 904. The control station 904 can use the received environmental related information (e.g., temperature readings) to control the heating and cooling equipment within the building 1102. As described below, the sensor 1006 (e.g., thermostat, smoke detector, surveillance camera, motion detector) of the present invention can monitor and transmit within impulse radio signals 908 different types of sensor related information including, for example, environmental related information, safety related information and surveillance related information.

In regards to safety related information, the sensor 1006 can take the form of a smoke detector 1006b, a gas detector 1006c (e.g., carbon monoxide detector) or any other sensor that can detect a dangerous substance within the building 1102. For instance, the smoke detector 1006b and the impulse radio unit 910 would operate together to transmit an impulse radio signal 908 having a known pseudorandom sequence of pulses that look like a series of Gaussian waveforms (see FIGS. 1–3) that convey safety related information towards the impulse radio unit 906 attached to the control station 904. In this example, the control station 904 is shown to be located in the security control center 1116. It should be understood that the control station 904 need not be located within the building 1102. Instead, the control station 904 can be located in another building (not shown) and can interact with the robot 902 via a telephone line and modem.

In regards to surveillance related information, the sensor 1006 can take the form of a surveillance camera 1006*d*, a motion detector 1006*e* or any other sensor that can monitor an area outside or within the building 1102. For instance, the surveillance camera 1006*d* and the impulse radio unit 910 would operate together to transmit impulse radio signals 908 having a known pseudorandom sequence of pulses that look like a series of Gaussian waveforms (see FIGS. 1–3) that convey surveillance related information to the impulse radio unit 906 attached to the control station 904. The control station 904 can be located in the security control center 1116 and include a display 1126 containing an overlay showing the video taken by the surveillance camera 1006*d*. In addition, the robot 902 could be capable of receiving impulse radio signals 908 from the control station 904 that control the focus and movement of the surveillance camera 1006*d*. In another application, the motion detector 1006*e* (or impulse radio unit 910) can use the radar capabilities of impulse radio technology to detect the presence of a person (e.g., intruder) and transmit this surveillance related information in impulse radio signals 908 to the control station 904. In fact, the impulse radio unit 910 can use the radar capabilities of impulse radio technology to detect the presence of a person (e.g., intruder) through a wall, floor or in areas not normally seen with the naked eye.

In regards to environmental related information, the sensor 1006 can take the form of a thermostat 1006*a*, a humidity detector 1006*f*, a dust detector 1006*g* or any other sensor that can monitor an environmental condition within the building 1102. For instance, the humidity detector 1006*f* and the impulse radio unit 910 would operate together to transmit impulse radio signals 908 having a known pseudorandom sequence of pulses that look like a series of Gaussian waveforms (see FIGS. 1–3) that convey environmental related information to the impulse radio unit 906 attached to a control station 904. The control station 904 attached to the dehumidifier/humidifier equipment can use the received environmental related information (e.g., humidity readings) to control the humidity within the building 1102.

As described above, the sensors 1006 can monitor a variety of conditions within the building 1102 and modulate and forward the information using impulse radio signals 908 to the control station 904. In fact, the control station 904 can be programmed to sound an alarm for building personnel whenever a monitored condition falls outside a predetermined range of acceptable conditions. In addition, the control station 904 can cause the sensor 1006 (e.g., smoke detectors 1006*b*) to sound an alarm whenever a monitored condition falls outside a predetermined range of acceptable conditions. Moreover, the control station 904 can remotely activate and control a particular sensor 1006 to monitor the environment with the building 1102.

The robot 902 may also include an interface unit 1128 (e.g., speaker, microphone) which enables two-way communications between the monitoring personnel at the control station 904 and people in the vicinity of the robot 902. The interface unit 1128 can include a display 1130 that enables the people in the vicinity of the robot 902 to view a variety of information including monitored information from the sensors 1006 and monitored vehicular parameter(s) (if any) of the robot 902.

The control station 904 may also interact with an Internet site 1132 and provide the current positions of the robots 902 within the building 1102, the monitored information from the sensors 1006 and the monitored vehicular parameter(s) of each robot 902. Thus, people (not shown) can use the robots 902 to monitor and control the environment within the building 1102. In other words, these people can control the actions of the robot 902 within the building.

To accomplish all of these tasks, the control station 904 needs to know the current position of a moving robot 902 and should also be able to control the movement of the robot 902. As briefly discussed above, the control station 904 can determine or at least be informed about the current position of the robot 902 using the position capabilities of impulse radio technology. To determine the current position of the robot 902, the impulse radio unit 910 associated with the robot 902 interacts with one or more reference impulse radio units 1002 (only eight shown in the building 1102) such that either the robot 902, the control station 904, or one of the reference impulse radio units 1002 can calculate the current position of the robot 902.

The reference impulse radio units 1002 (only 8 shown) have known positions and are located to provide maximum coverage within the building 1102. The control station 904 typically has a hardwire connection but could have a wireless connection to the reference impulse radio units 1002. Each robot 902 (only two shown in FIG. 12) is capable of moving around within the building 1102 and interacting with one or more of the reference impulse radio units 1002 such that either the control station 904, the robot 902 or one of the reference impulse radio units 1002 can calculate the current position of the robot 902. A variety of impulse radio positioning networks (e.g., two or more reference impulse radio units 1002 and one or more robots 902) that enable the present invention to perform the positioning and tracking functions are described in greater detail below with reference to FIGS. 14–25.

For instance, the positioning and tracking functions can be accomplished by stepping through several steps. The first step is for the reference impulse radio units 1002 to synchronize together and begin passing information. Then, when a robot 902 is powered-on or enters the building 1102, it synchronizes itself to the previously synchronized reference impulse radio units 1002. Once the robot 902 is synchronized, it begins collecting and time-tagging range measurements from any available reference impulse radio units 1002. The robot 902 then takes these time-tagged ranges and, using a least squares-based or similar estimator, calculates its position within the building 1102. Alternatively, one of the reference impulse radio units 1002 can calculate the position of the robot 902. Thereafter, the robot 902 or one of the reference impulse radio units 1002 forwards its position calculation to the control station 904 for storage and/or real-time display. It should be understood that the control station 904 can be programmed to track only the robot(s) 902 that the monitoring personnel want to watch at one time.

Figure 12:
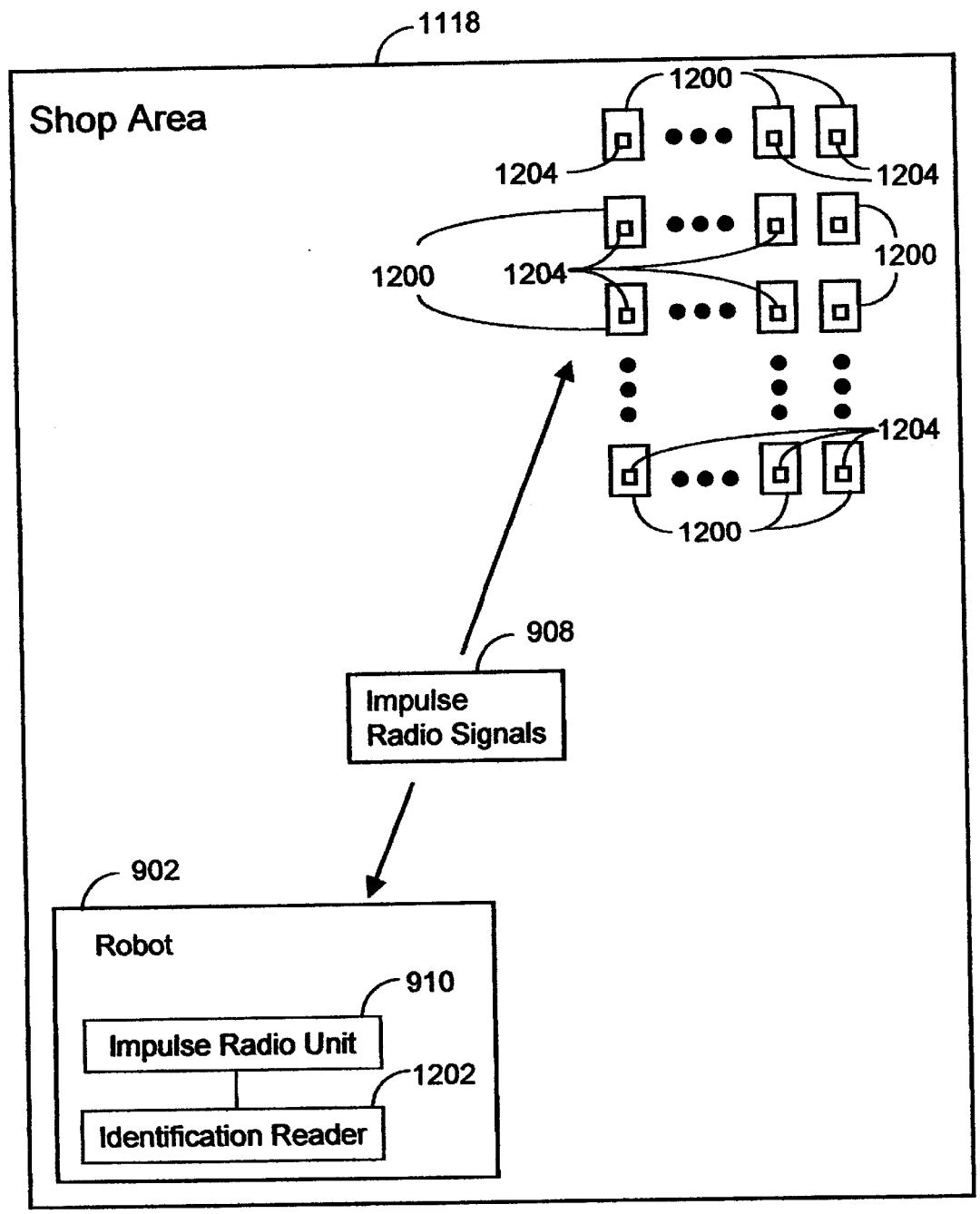
FIG. 12 is a diagram illustrating in greater detail the robot and control station of FIG. 10 used in a manner to monitor and track physical assets within the building.

Referring to FIG. 12, there is a diagram illustrating in greater detail the robot and control station of FIG. 10 used in a manner to monitor and track physical assets 1200 within the building 1102. As illustrated, the physical assets 1200 are located in the shop area 1118 of the building 1102 but they could be located throughout the building 1102. Basically, the robot 902 can incorporate an identification reader 1202 that can receive impulse radio signals 908 containing identification information from wireless identification tags 1204 that are attached to physical assets 1200. The identification information can be a basic identification number that can be used to identify a particular physical asset. As such, the identification reader 1202 coupled to the impulse radio unit 910 can use impulse radio technology to help building personnel at the control station 904 keep track of a wide array of physical assets 1200. Physical assets 1200 can include just about an valuable asset including, for example, commercial goods, military goods, artwork, computers, cash drawers.

In addition to keeping track of physical assets 1200, the robot 902 and the identification reader 1202 can use the positioning capabilities of impulse radio technology to locate each physical asset 1200. One way, to determine the position of each physical asset 1200 would be to use the positioning process described above wherein the reference impulse radio units 1002 would interact with the wireless identification tags 1204 on the physical assets 1200. This process of determining the position of physical assets 1200 is very similar to the process of determining the position of the robot 902 within the building 1102.

Another way, to determine the position of each physical asset 1200 would be to enable the robot 902 itself to determine the position of each asset 1200. For instance, a robot 902 including the identification reader 1202 could take multiple range measurements (e.g., measuring signal strength) of each wireless identification tag 1204 as it moves within the building 1102, which enables a trilateration capability of the robot 902 to more precisely locate each wireless identification tag 1204 on each physical asset 1200.

Alternatively, the robot 902 can move and attempt to locate a particular physical asset 1200. This capability would typically require a two-way wireless identification tag 1204 in order to be able to perform the half-duplex ranging function at the robot 902. A two-way wireless identification tag 1204 would include a transmitting impulse radio unit 702 and a receiving impulse radio unit 602 (see FIGS. 6 and 7). Of course, the two-way wireless identification tag 1204 would have higher power requirements than a transmit-only wireless identification tag 1204. But, the battery life of the two-way wireless identification tag 1204 would increase if the tag 1204 used a protocol referred to a pseudo-transmit-only protocol. In this mode, the two-way wireless identification tag 1204 is normally in a sleep mode (neither listening or transmitting) but periodically wakes-up to transmit identification information at predetermined intervals and then receive transmissions from the robot 902 for a short period of time following transmission of the identification information. In the receive mode, the two-way wireless identification tag 1204 would listen for range or status requests from the robot 902. The receive mode does use extra power not consumed in a transmit-only tag, but it only needs to be in this mode for a few milliseconds. Normally, the two-way wireless identification tag 1204 hears no response from the robot 902 and goes back to sleep. However, if the robot 902 needed to know the range to the two-way wireless identification tag 1204 or other status, it would initiate a range request that the two-way wireless identification tag 1204 hears and then answers. Thus, this type of two-way wireless identification tag 1204 has a power budget only a little worse than a transmit-only wireless identification tag 1204.

Figure 13:
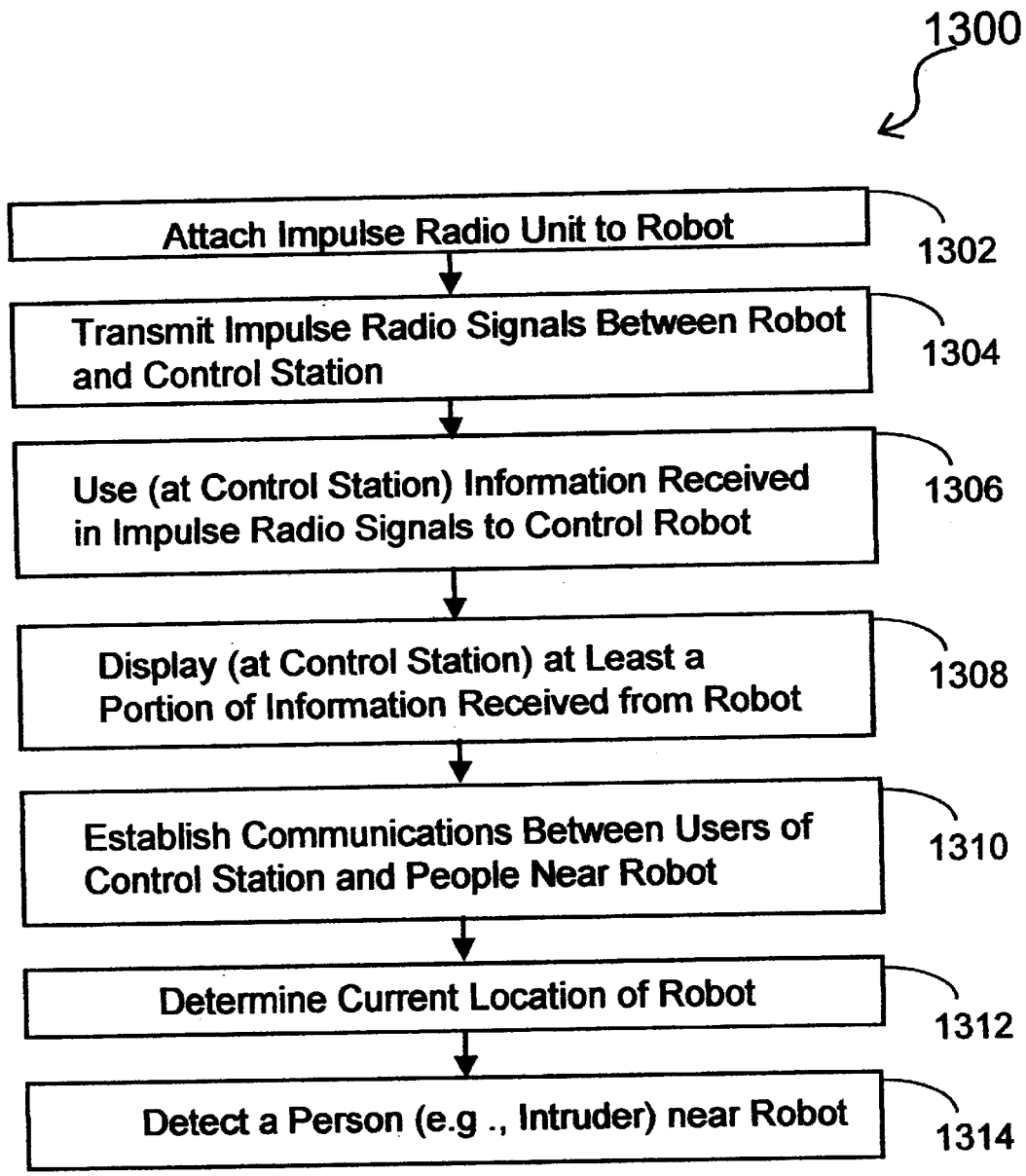
FIG. 13 is a flowchart illustrating the basic steps of a preferred method for controlling the actions of a robot in accordance with the present invention.

Referring to FIG. 13, there is a flowchart illustrating the basic steps of a preferred method 1300 for controlling the actions of a robot 902. Beginning at step 1302, the robot 902 is attached to the impulse radio unit 910 which typically includes an impulse radio transmitter 602 and an impulse radio receiver 702.

At step 1304, the robot 902 and impulse radio unit 910 would operate together to communicate with the control station 904 using impulse radio signals 908 that contain information about the robot 902 and the area surrounding the robot 902. Again, the control station 904 may be located in the same building 1102 as the robot 902 or it may be remotely located and still interact with and control the robot 902.

At step 1306, the control station 904 and monitoring personnel can then use the information conveyed in the impulse radio signals 908 to control the actions of the robot 902. For instance, the control station 904 can use the conveyed information to control the actions of the robot 902 in order to monitor and control, if needed, the environment within the building 1102. The information obtained by the robot 902 and conveyed in impulse radio signals 908 to the control station 904 can include a wide variety of information including, for example, environmental related information, safety related information, inventory related information and surveillance related information.

At step 1308, the control station 904 can display all or a portion of the information received from the robot 902. Monitoring personnel can use the displayed information to control the movements and actions of the robot 902. In particular, the control station 904 can use the conveyed information to control the actions of the robot 902 in order to monitor and control, if needed, the environment within the building 1102.

At step 1310, the control station 904 and monitoring personnel can use impulse radio technology to establish communications with a person near the robot 902.

At step 1312, the control station 904 could use the positioning capabilities of impulse radio technology to periodically determine a position of each robot 902. Again, the control station 904 and a series of reference impulse radio units 1002 can operate together to determine the position of a robot 902. In particular, the reference impulse radio units 1002 have known positions and are located to provide maximum coverage throughout the building 1102. Each robot 902 is capable of interacting with one or more of the reference impulse radio units 1002 such that either the robot 902, the control station 904, or one of the reference impulse radio units 1002 is able to triangulate and calculate the current position of a robot 902.

At step 1314, the robot 902 can use the radar capability of the impulse radio unit to detect a person (e.g., intruder) in the vicinity of the robot 902. It should be understood that the robot 902 can utilize on one chip (i.e., the impulse radio unit 910) the revolutionary position capabilities, radar capabilities and/or communication capabilities of impulse radio technology to perform the above-mentioned functions. Described below are some exemplary functions that can be performed by the robot 902 which can take many different shapes including, for example, a toy, a security robot, an industrial robot (i.e., welder, manufacturer.) and a micro-airplane.

Impulse Radio Positioning Networks

A variety of impulse radio positioning networks capable of performing the positioning and tracking functions of the present invention are described in this Section (see also U.S. patent application Ser. No. 09/456,409). An impulse radio positioning network includes a set of reference impulse radio units 1002 (shown below as reference impulse radio units R1–R6), one or more robots 902 (shown below as robots M1–M3) and a control station 904.

Synchronized Transceiver Tracking Architecture

Figure 14:
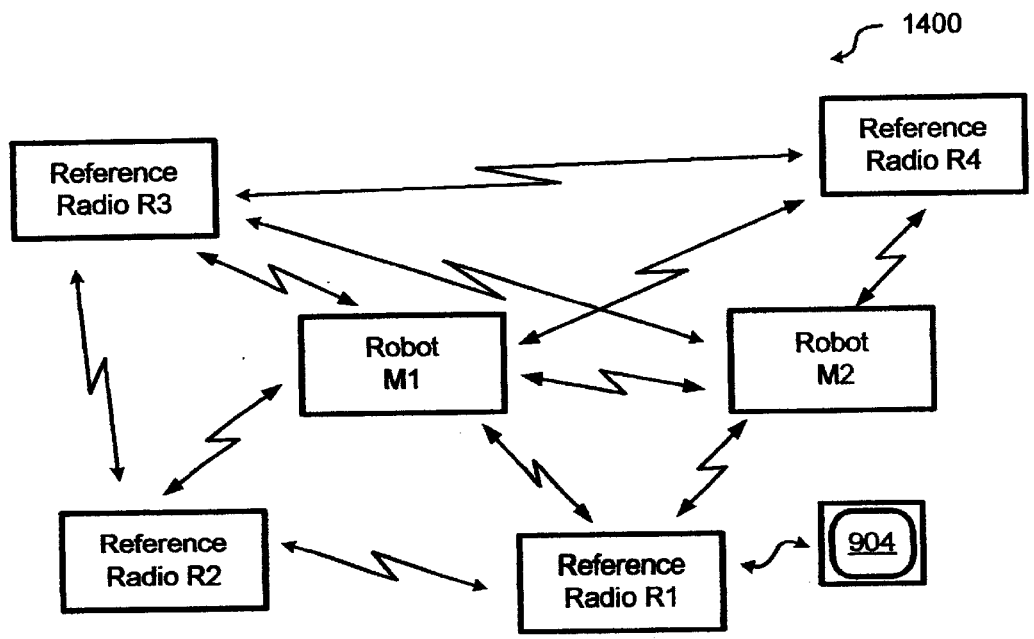
FIG. 14 is a block diagram of an impulse radio positioning network utilizing a synchronized transceiver tracking architecture that can be used in the present invention.

Referring to FIG. 14, there is illustrated a block diagram of an impulse radio positioning network 1400 utilizing a synchronized transceiver tracking architecture. This architecture is perhaps the most generic of the impulse radio positioning networks since both robots M1 and M2 and reference impulse radio units R1–R4 are full two-way transceivers. The network 1400 is designed to be scalable, allowing from very few robots M1 and M2 and reference impulse radio units R1–R4 to a very large number. This particular example of the synchronized transceiver tracking architecture shows a network 1400 of four reference impulse radio units R1–R4 and two robots M1 and M2. The arrows between the radios represent two-way data and/or information links. A fully inter-connected network would have every radio continually communicating with every other radio, but this is not required and can be dependent upon the needs of the particular application.

Each radio is a two-way transceiver; thus each link between radios is two-way (duplex). Precise ranging information (the distance between two radios) is distributed around the network 1400 in such a way as to allow the robots M1 and M2 to determine their precise three-dimensional position within a local coordinate system. This position, along with other data or information traffic, can then be relayed from the robots M1 and M2 back to the reference master impulse radio unit R1, one of the other reference relay impulse radio units R2–R4 or the control station 904.

The radios used in this architecture are impulse radio two-way transceivers. The hardware of the reference impulse radio units R1–R4 and robots M1 and M2 is essentially the same. The firmware, however, varies slightly based on the functions each radio must perform. For example, the reference master impulse radio unit R1 directs the passing of information and is typically responsible for collecting all the data for external graphical display at the control station 904. The remaining reference relay impulse radio units R2–R4 contain a separate version of the firmware, the primary difference being the different parameters or information that each reference relay impulse radio unit R2–R4 must provide the network. Finally, the robots M1 and M2 have their own firmware version that calculates their position.

In FIG. 14, each radio link is a two-way link that allows for the passing of information, both data and/or information. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of radios within the network, both robots M1 and M2 and reference impulse radio units R1–R4, are able to synchronize themselves. The oscillators used on the impulse radio boards drift slowly in time, thus they may require continual monitoring and adjustment of synchronization. The accuracy of this synchronization process (timing) is dependent upon several factors including, for example, how often and how long each radio transmits.

The purpose of this impulse radio positioning network 1400 is to enable the tracking of the robots M1 and M2. Tracking is accomplished by stepping through several well-defined steps. The first step is for the reference impulse radio units R1-R4 to synchronize together and begin passing information. Then, when a robot M1 or M2 enters the network area, it synchronizes itself to the previously synchronized reference impulse radio units R1–R4. Once the robot M1 or M2 is synchronized, it begins collecting and time-tagging range measurements from any available reference impulse radio units R1–R4 (or other robot M1 or M2). The robot M1 or M2 then takes these time-tagged ranges and, using a least squares-based or similar estimator, calculates the position of the robot M1 or M2 in local coordinates. If the situation warrants and the conversion possible, the local coordinates can be converted to any one of the world-wide coordinates such as Earth Centered Inertial (ECI), Earth Centered Earth Fixed (ECEF), or J2000 (inertial coordinates fixed to year 2000). Finally, the robot M1 or M2 forwards its position calculation to the control station 904 for storage and real-time display.

Unsynchronized Transceiver Tracking Architecture

Figure 15:
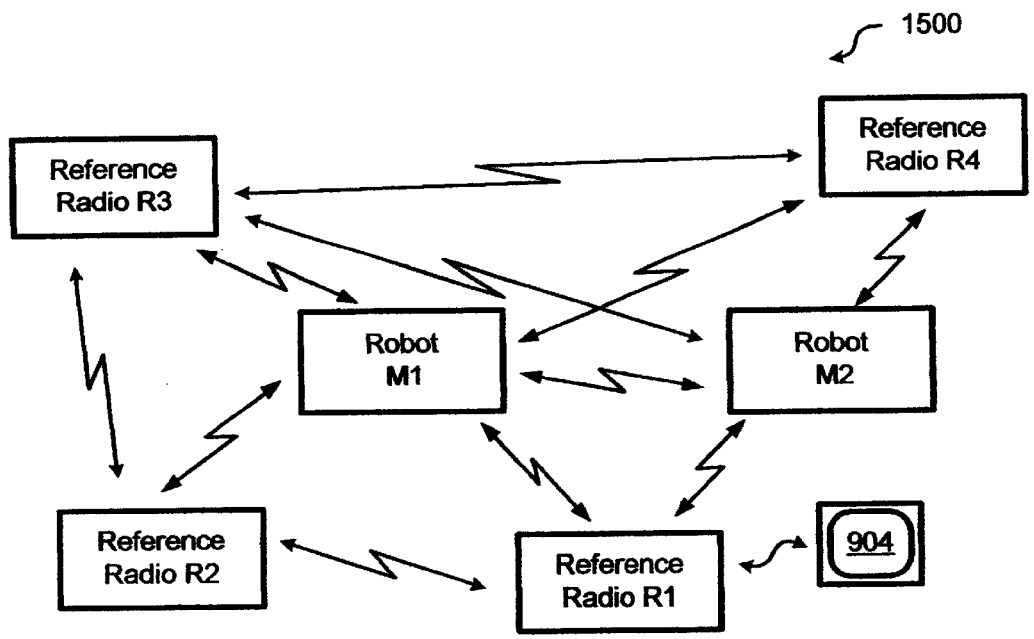
FIG. 15 is a block diagram of an impulse radio positioning network utilizing an unsynchronized transceiver tracking architecture that can be used in the present invention.

Referring to FIG. 15, there is illustrated a block diagram of an impulse radio positioning network 1500 utilizing an unsynchronized transceiver tracking architecture. This architecture is similar to synchronized transceiver tracking of FIG. 14, except that the reference impulse radio units R1–R4 are not time-synchronized. Both the robots M1 and M2 and reference impulse radio units R1–R4 for this architecture are full two-way transceivers. The network is designed to be scalable, allowing from very few robots M1 and M2 and reference impulse radio units R1–R4 and to a very large number. This particular example of the unsynchronized transceiver tracking architecture shows a network 1500 of four reference impulse radio units R1–R4 and two robots M1 and M2. The arrows between the radios represent two-way data and/or information links. A fully inter-connected network would have every radio continually communicating with every other radio, but this is not required and can be defined as to the needs of the particular application.

Each radio is a two-way transceiver; thus each link between radios is two-way (duplex). Precise ranging information (the distance between two radios) is distributed around the network in such a way as to allow the robots M1 and M2 to determine their precise three-dimensional position within a local coordinate system. This position, along with other data or information traffic, can then be relayed from the robots M1 and M2 back to the reference master impulse radio unit R1, one of the other reference relay impulse radio units R2–R3 or the control station 904.

The radios used in the architecture of FIG. 15 are impulse radio two-way transceivers. The hardware of the reference impulse radio units R1–R4 and robots M1 and M2 is essentially the same. The firmware, however, varies slightly based on the functions each radio must perform. For example, the reference master impulse radio unit R1 directs the passing of information, and typically is responsible for collecting all the data for external graphical display at the control station 904. The remaining reference relay impulse radio units R2–R4 contain a separate version of the firmware, the primary difference being the different parameters or information that each reference relay radio must provide the network. Finally, the robots M1 and M2 have their own firmware version that calculates their position and displays it locally if desired. In FIG. 15, each radio link is a two-way link that allows for the passing of information, data and/or information. The data-rates between each radio link is a function of several variables including the number of pulses integrated to get a single bit, the number of bits per data parameter, the length of any headers required in the messages, the range bin size, and the number of radios in the network.

Unlike the radios in the synchronized transceiver tracking architecture, the reference impulse radio units R1–R4 in this architecture are not time-synchronized as a network. These reference impulse radio units R1–R4 operate independently (free-running) and provide ranges to the robots M1 and M2 either periodically, randomly, or when tasked. Depending upon the application and situation, the reference impulse radio units R1–R4 may or may not talk to other reference radios in the network.

As with the architecture of FIG. 14, the purpose of this impulse radio positioning network 1500 is to enable the tracking of robots M1 and M2. Tracking is accomplished by stepping through several steps. These steps are dependent upon the way in which the reference impulse radio units R1–R4 range with the robots M1 and M2 (periodically, randomly, or when tasked). When a robot M1 or M2 enters the network area, it either listens for reference impulse radio units R1–R4 to broadcast, then responds, or it queries (tasks) the desired reference impulse radio units R1–R4 to respond. The robot M1 or M2 begins collecting and time-tagging range measurements from reference (or other mobile) radios. The robot M1 or M2 then takes these time-tagged ranges and, using a least squares-based or similar estimator, calculates the position of the robot M1 or M2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the robot M1 or M2 forwards its position calculation to the control station 904 for storage and real-time display.

Synchronized Transmitter Tracking Architecture

Figure 16:
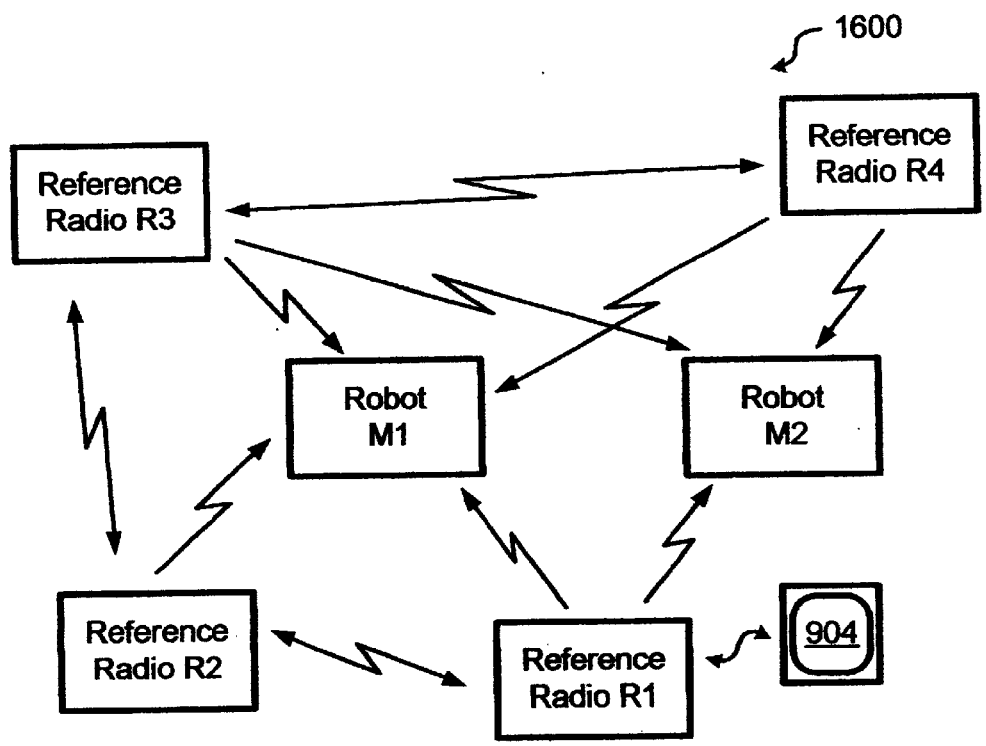
FIG. 16 is a block diagram of an impulse radio positioning network utilizing a synchronized transmitter tracking architecture that can be used in the present invention.

Referring to FIG. 16, there is illustrated a block diagram of an impulse radio positioning network 1600 utilizing a synchronized transmitter tracking architecture. This architecture is perhaps the simplest of the impulse radio positioning architectures, from the point-of-view of the robots M1 and M2, since the robots M1 and M2 simply transmit in a free-running sense. The network is designed to be scalable, allowing from very few robots M1 and M2 and reference impulse radio units R1–R4 to a very large number. This architecture is especially applicable to an "RF tag" (radio frequency tag) type of application.

This particular example of synchronized transmitter tracking architecture shows a network 1600 of four reference impulse radio units radios R1–R4 and two robots M1 and M2. The arrows between the radios represent two-way and one-way data and/or information links. Notice that the robots M1 and M2 only transmit, thus they do not receive the transmissions from the other radios.

Each reference impulse radio unit R1–R4 is a two-way transceiver; thus each link between reference impulse radio units R1–R4 is two-way (duplex). Precise ranging information (the distance between two radios) is distributed around the network in such a way as to allow the synchronized reference impulse radio units R1–R4 to receive transmissions from the robots M1 and M2 and then determine the three-dimensional position of the robots M1 and M2. This position, along with other data or information traffic, can then be relayed from reference relay impulse radio units R2–R4 back to the reference master impulse radio unit R1 or the control station 904.

The reference impulse radio units R1–R4 used in this architecture are impulse radio two-way transceivers, the robots M1 and M2 are one-way transmitters. The firmware in the radios varies slightly based on the functions each radio must perform. For example, the reference master impulse radio unit R1 is designated to direct the passing of information, and typically is responsible for collecting all the data for external graphical display at the control station 904. The remaining reference relay impulse radio units R2–R4 contain a separate version of the firmware, the primary difference being the different parameters or information that each reference relay impulse radio unit R2–R4 must provide the network. Finally, the robots M1 and M2 have their own firmware version that transmits pulses in predetermined sequences.

Each reference radio link is a two-way link that allows for the passing of information, data and/or information. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other radios transmit in their assigned transmit time slots, the entire group of reference impulse radio units R1–R4 within the network are able to synchronize themselves. The oscillators used on the impulse radio boards drift slowly in time, thus they may require monitoring and adjustment to maintain synchronization. The accuracy of this synchronization process (timing) is dependent upon several factors including, for example, how often and how long each radio transmits along with other factors. The robots M1 and M2, since they are transmit-only transmitters, are not time-synchronized to the synchronized reference impulse radio units R1–R4.

The purpose of the impulse radio positioning network is to enable the tracking of robots M1 and M2. Tracking is accomplished by stepping through several well-defined steps. The first step is for the reference impulse radio units R1–R4 to synchronize together and begin passing information. Then, when a robot M1 or M2 enters the network area and begins to transmit pulses, the reference impulse radio units R1–R4 pick up these pulses as time-of-arrivals (TOAs). Multiple TOAs collected by different synchronized reference impulse radio units R1–R4 are then converted to ranges, which are then used to calculate the XYZ position of the robot M1 or M2 in local coordinates. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Finally, the reference impulse radio units R1–R4 forwards their position calculation to the control station 904 for storage and real-time display.

Unsynchronized Transmitter Tracking Architecture

Figure 17:
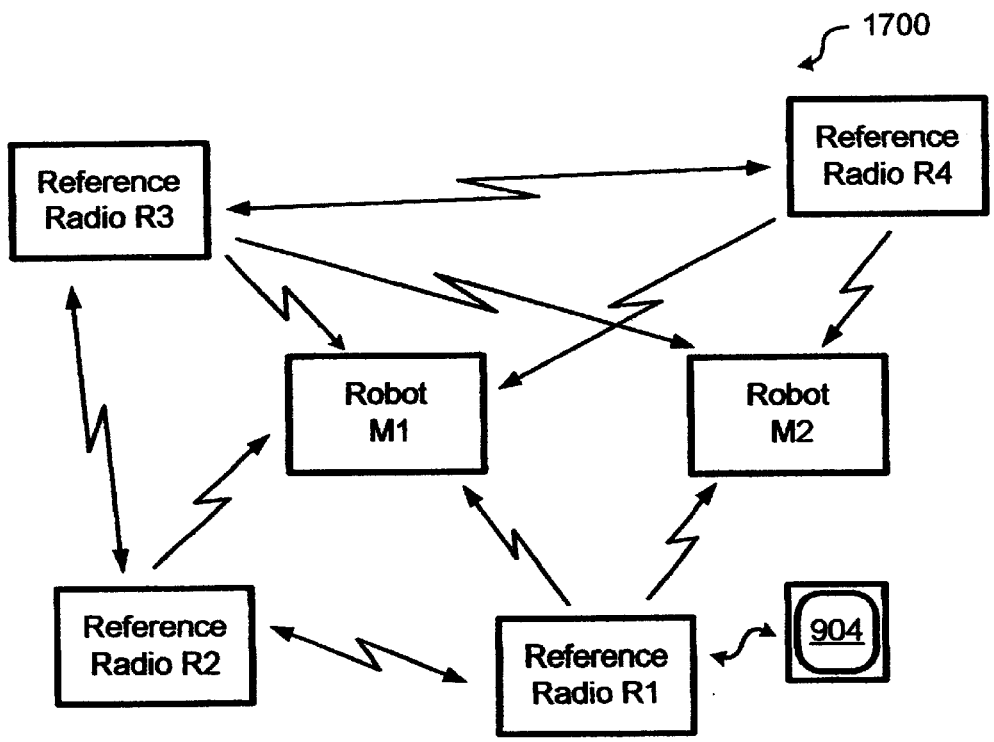
FIG. 17 is a block diagram of an impulse radio positioning network utilizing an unsynchronized transmitter tracking architecture that can be used in the present invention.

Referring to FIG. 17, there is illustrated a block diagram of an impulse radio positioning network 1700 utilizing an unsynchronized transmitter tracking architecture. This architecture is very similar to the synchronized transmitter tracking architecture except that the reference impulse radio units R1–R4 are not synchronized in time. In other words, both the reference impulse radio units R1–R4 and the robots M1 and M2 are free-running. The network is designed to be scalable, allowing from very few robots M1 and M2 and reference impulse radio units R1–R4 to a very large number. This architecture is especially applicable to an "RF tag" (radio frequency tag) type of application.

This particular example of the unsynchronized transmitter tracking architecture shows a network 1700 of four reference impulse radio units R1–R4 and two robots M1 and M2. The arrows between the radios represent two-way and one-way data and/or information links. Notice that the robots M1 and M2 only transmit, thus they do not receive the transmissions from the other radios. Unlike the synchronous transmitter tracking architecture, the reference impulse radio units R1–R4 in this architecture are free-running (unsynchronized). There are several ways to implement this design, the most common involves relaying the time-of-arrival (TOA) pulses from the robots M1 and M2 and reference impulse radio units R1–R4, as received at the reference impulse radio units R1–R4, back to the reference master impulse radio unit R1 which communicates with the control station 904.

Each reference impulse radio unit R1–R4 in this architecture is a two-way impulse radio transceiver; thus each link between reference impulse radio unit R1–R4 can be either two-way (duplex) or one-way (simplex). TOA information is typically transmitted from the reference impulse radio units R1–R4 back to the reference master impulse radio unit R1 where the TOAs are converted to ranges and then an XYZ position of the robot M1 or M2, which can then be forwarded and displayed at the control station 904.

The reference impulse radio units R1–R4 used in this architecture are impulse radio two-way transceivers, the robots M1 and M2 are one-way impulse radio transmitters. The firmware in the radios varies slightly based on the functions each radio must perform. For example, the reference master impulse radio R1 collects the TOA information, and is typically responsible for forwarding this tracking data to the control station 904. The remaining reference relay impulse radio units R2–R4 contain a separate version of the firmware, the primary difference being the different parameters or information that each reference relay impulse radio units R2–R4 must provide the network. Finally, the robots M1 and M2 have their own firmware version that transmits pulses in predetermined sequences.

Each reference radio link is a two-way link that allows for the passing of information, data and/or information. The data-rates between each radio link is a function of several variables including the number of pulses integrated to get a single bit, the number of bits per data parameter, the length of any headers required in the messages, the range bin size, and the number of radios in the network.

Since the reference impulse radio units R1–R4 and robots M1 and M2 are free-running, synchronization is actually done by the reference master impulse radio unit R1. The oscillators used in the impulse radios drift slowly in time, thus they may require monitoring and adjustment to maintain synchronization at the reference master impulse radio unit R1. The accuracy of this synchronization (timing) is dependent upon several factors including, for example, how often and how long each radio transmits along with other factors.

The purpose of the impulse radio positioning network is to enable the tracking of robots M1 and M2. Tracking is accomplished by stepping through several steps. The most likely method is to have each reference impulse radio unit R1–R4 periodically (randomly) transmit a pulse sequence. Then, when a robot M1 or M2 enters the network area and begins to transmit pulses, the reference impulse radio units R1–R4 pick up these pulses as time-of-arrivals (TOAs) as well as the pulses (TOAs) transmitted by the other reference radios. TOAs can then either be relayed back to the reference master impulse radio unit R1 or just collected directly (assuming it can pick up all the transmissions). The reference master impulse radio unit R1 then converts these TOAs to ranges, which are then used to calculate the XYZ position of the robot M1 or M2. If the situation warrants and the conversion possible, the XYZ position can be converted to any one of the worldwide coordinates such as Earth Centered Inertial (ECI), Earth Centered Earth Fixed (ECEF), or J2000 (inertial coordinates fixed to year 2000). Finally, the reference master impulse radio unit R1 forwards its position calculation to the control station 904 for storage and real-time display.

Synchronized Receiver Tracking Architecture

Figure 18:
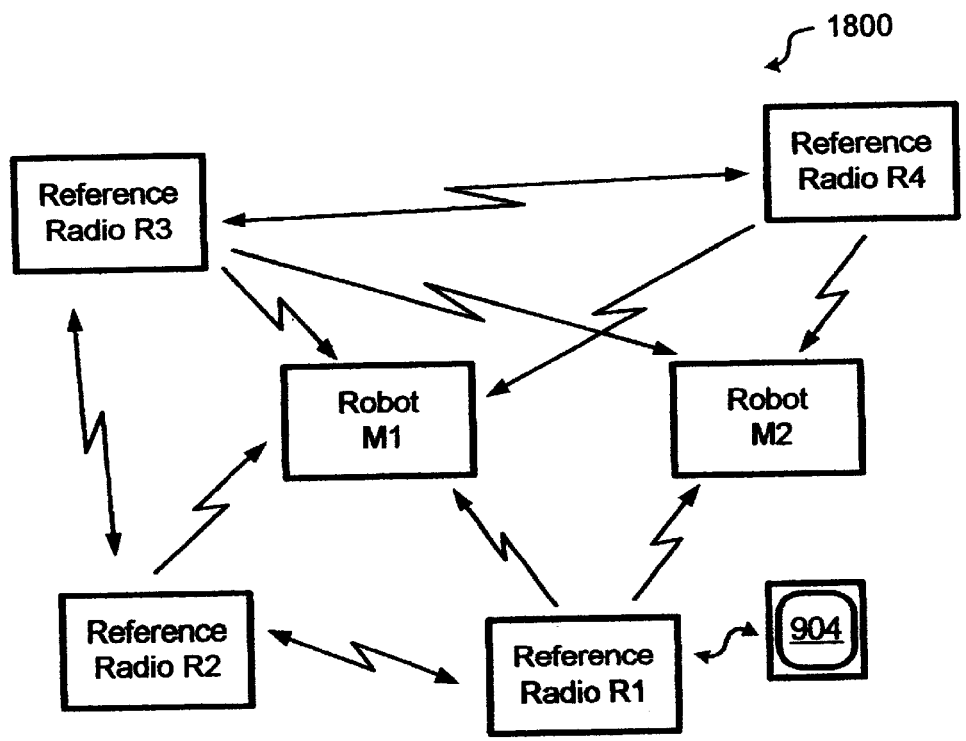
FIG. 18 is a block diagram of an impulse radio positioning network utilizing a synchronized receiver tracking architecture that can be used in the present invention.

Referring to FIG. 18, there is illustrated a block diagram of an impulse radio positioning network 1800 utilizing a synchronized receiver tracking architecture. This architecture is different from the synchronized transmitter tracking architecture in that in this design the robots M1 and M2 determine their positions but are not able to broadcast it to anyone since they are receive-only radios. The network is designed to be scalable, allowing from very few robots M1 and M2 and reference impulse radio units R1–R4 to a very large number.

This particular example of the synchronized receiver tracking architecture shows a network 1800 of four reference impulse radio units R1–R4 and two robots M1 and M2. The arrows between the radios represent two-way and one-way data and/or information links. Notice that the robots M1 and M2 receive transmissions from other radios, and do not transmit.

Each reference impulse radio unit R1–R4 is a two-way transceiver, and each robot M1 and M2 is a receive-only radio. Precise, synchronized pulses are transmitted by the reference network and received by the reference impulse radio units R1–R4 and the robots M1 and M2. The robots M1 and M2 take these times-of-arrival (TOA) pulses, convert them to ranges, then determine their XYZ positions. Since the robots M1 and M2 do not transmit, only they themselves know their XYZ positions.

The reference impulse radio units R1–R4 used in this architecture are impulse radio two-way transceivers, the robots M1 and M2 are receive-only radios. The firmware for the radios varies slightly based on the functions each radio must perform. For example, the reference master impulse radio unit R1 is designated to direct the synchronization of the reference radio network. The remaining reference relay impulse radio units R2–R4 contain a separate version of the firmware, the primary difference being the different parameters or information that each reference relay impulse radio unit R2–R4 must provide the network. Finally, the robots M1 and M2 have their own firmware version that calculates their position and displays it locally if desired.

Each reference radio link is a two-way link that allows for the passing of information, data and/or information. The robots M1 and M2 are receive-only. The data-rates between each radio link is a function of several variables including the number of pulses integrated to get a single bit, the number of bits per data parameter, the length of any headers required in the messages, the range bin size, and the number of radios in the network.

By transmitting in assigned time slots and by carefully listening to the other reference impulse radio units R1-R4 transmit in their assigned transmit time slots, the entire group of reference impulse radio units R1–R4 within the network are able to synchronize themselves. The oscillators used on the impulse radio boards may drift slowly in time, thus they may require monitoring and adjustment to maintain synchronization. The accuracy of this synchronization (timing) is dependent upon several factors including, for example, how often and how long each radio transmits along with other factors.

The purpose of the impulse radio positioning network is to enable the tracking of robots M1 and M2. Tracking is accomplished by stepping through several well-defined steps. The first step is for the reference impulse radio units R1–R4 to synchronize together and begin passing information. Then, when a robot M1 or M2 enters the network area, it begins receiving the time-of-arrival (TOA) pulses from the reference radio network. These TOA pulses are converted to ranges, then the ranges are used to determine the XYZ position of the robot M1 or M2 in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Unsynchronized Receiver Tracking Architecture

Figure 19:
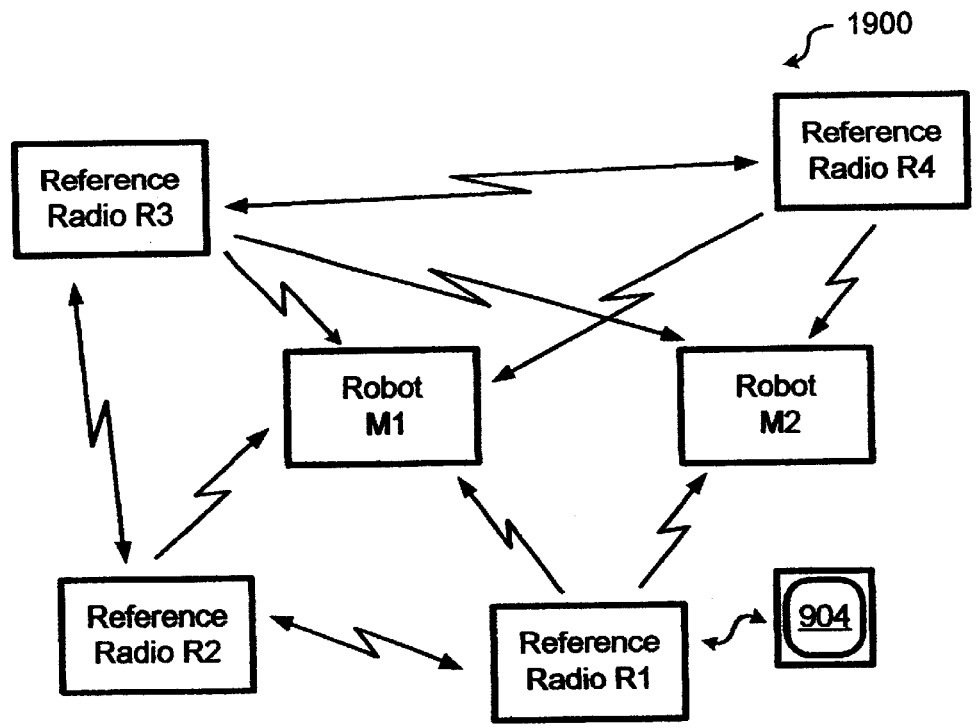
FIG. 19 is a block diagram of an impulse radio positioning network utilizing an unsynchronized receiver tracking architecture that can be used in the present invention.

Referring to FIG. 19, there is illustrated a block diagram of an impulse radio positioning network 1900 utilizing an unsynchronized receiver tracking architecture. This architecture is different from the synchronized receiver tracking architecture in that in this design the reference impulse radio units R1–R4 are not time-synchronized. Similar to the synchronized receiver tracking architecture, robots M1 and M2 determine their positions but cannot broadcast them to anyone since they are receive-only radios. The network is designed to be scalable, allowing from very few robots M1 and M2 and reference impulse radio units R1–R4 to a very large number.

This particular example of the unsynchronized receiver tracking architecture shows a network 1900 of four reference impulse radio units R1–R4 and two robots M1 and M2. The arrows between the radios represent two-way and one-way data and/or information links. Notice that the robots M1 and M2 only receive transmissions from other radios, and do not transmit.

Each reference impulse radio unit R1–R4 is an impulse radio two-way transceiver, each robot M1 and M2 is a receive-only impulse radio. Precise, unsynchronized pulses are transmitted by the reference network and received by the other reference impulse radio units R1–R4 and the robots M1 and M2. The robots M1 and M2 take these times-of-arrival (TOA) pulses, convert them to ranges, and then determine their XYZ positions. Since the robots M1 and M2 do not transmit, only they themselves know their XYZ positions.

The reference impulse radio units R1-R4 used in this architecture are impulse radio two-way transceivers, the robots M1 and M2 are receive-only radios. The firmware for the radios varies slightly based on the functions each radio must perform. For this design, the reference master impulse radio unit R1 may be used to provide some synchronization information to the robots M1 and M2. The robots M1 and M2 know the XYZ position for each reference impulse radio unit R1–R4 and as such they may do all of the synchronization internally.

The data-rates between each radio link is a function of several variables including the number of pulses integrated to get a single bit, the number of bits per data parameter, the length of any headers required in the messages, the range bin size, and the number of impulse radios in the network.

For this architecture, the reference impulse radio units R1–R4 transmit in a free-running (unsynchronized) manner. The oscillators used on the impulse radio boards often drift slowly in time, thus requiring monitoring and adjustment of synchronization by the reference master impulse radio unit R1 or the robots M1 and M2 (whomever is doing the synchronization). The accuracy of this synchronization (timing) is dependent upon several factors including, for example, how often and how long each radio transmits.

The purpose of the impulse radio positioning network is to enable the tracking robots M1 and M2. Tracking is accomplished by stepping through several steps. The first step is for the reference impulse radio units R1–R4 to begin transmitting pulses in a free-running (random) manner. Then, when a robot M1 or M2 enters the network area, it begins receiving the time-of-arrival (TOA) pulses from the reference radio network. These TOA pulses are converted to ranges, then the ranges are used to determine the XYZ position of the robot M1 or M2 in local coordinates using a least squares-based estimator. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000).

Mixed Mode Tracking Architecture

For ease of reference, in FIGS. 20–25 the below legend applies.

| Symbols and Definitions | |
|---|---|
| ⟿ | Receiver Radio (receive only) |
| X | Transmitter Radio (transmit only) |
| X⟿ | Transceiver Radio (receive and transmit) |
| $R_i$ | Reference Radio (fixed location) |
| $M_i$ | Mobile Radio (radio being tracked) |
| ⇌ | Duplex Radio Link |
| → | Simplex Radio Link |
| TOA, DTOA | Time of Arrival, Differenced TOA |

Figure 20:
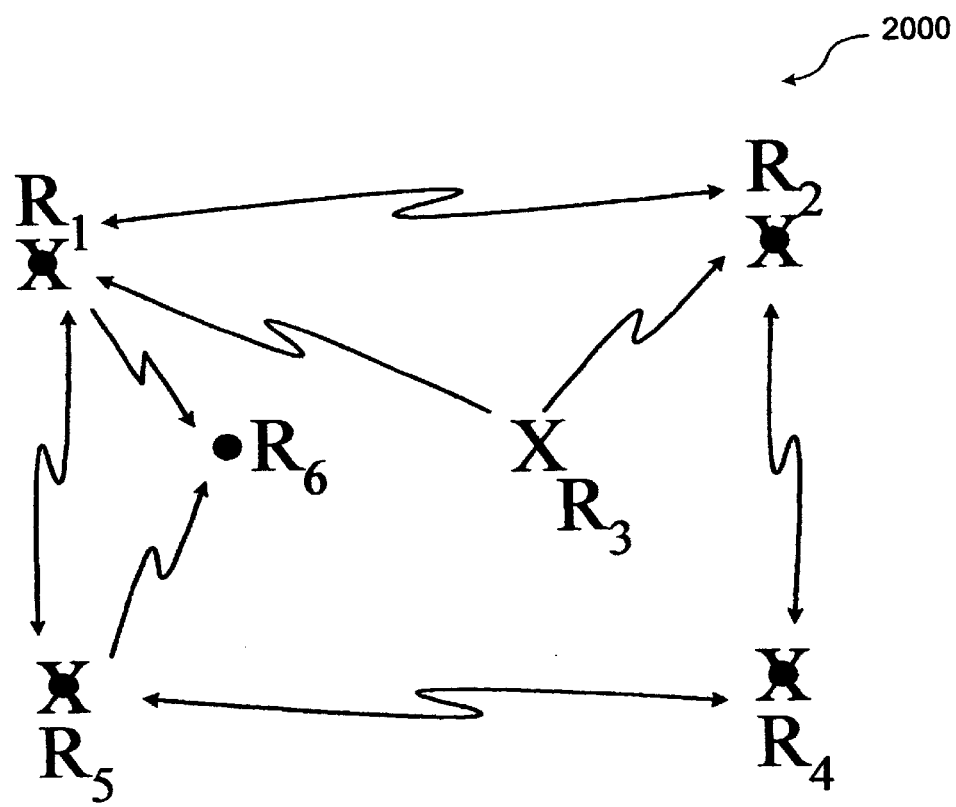
FIG. 20 is a diagram of an impulse radio positioning network utilizing a mixed mode reference radio tracking architecture that can be used in the present invention.

Referring to FIG. 20, there is illustrated a diagram of an impulse radio positioning network 2000 utilizing a mixed mode reference radio tracking architecture. This architecture defines a network of reference impulse radio units R1–R6 comprised of any combination of transceivers ($R_1$, $R_2$, $R_4$, $R_5$), transmitters ($R_3$), and receivers ($R_6$). Mobile nodes (none shown) entering this mixed-mode reference network use whatever reference radios are appropriate to determine their positions.

Figure 21:
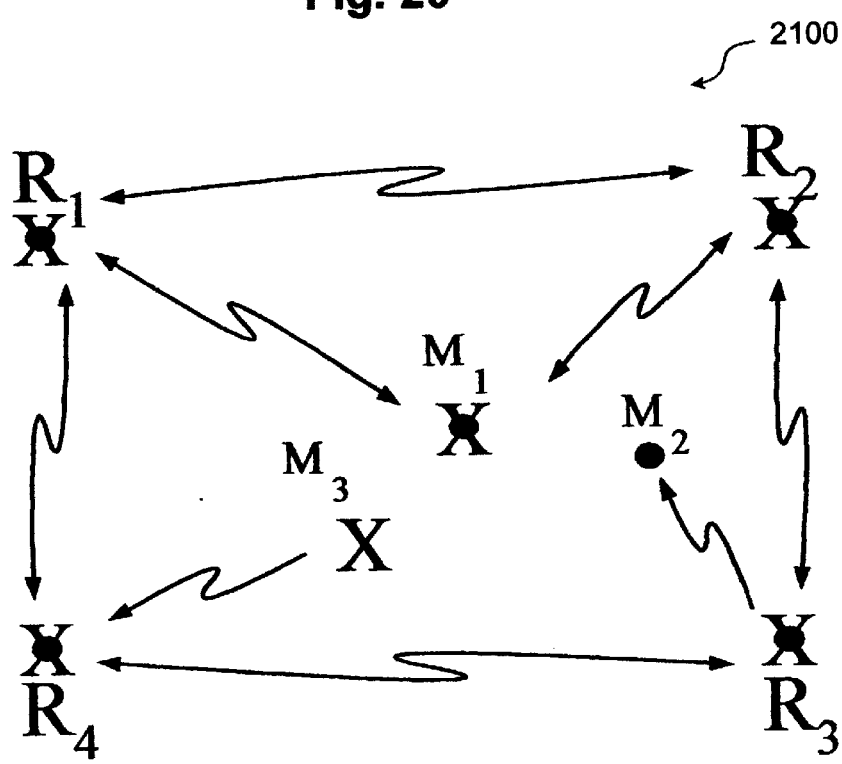
FIG. 21 is a diagram of an impulse radio positioning network utilizing a mixed mode mobile apparatus tracking architecture that can be used in the present invention.

Referring to FIG. 21, there is a diagram of an impulse radio positioning network 2100 utilizing a mixed mode mobile apparatus tracking architecture. Herein, the robots R1–R3 are mixed mode and reference impulse radio units R1–R4 are likely time-synched. In this illustrative example, the robot M1 is a transceiver, robot M2 is a transmitter, and robot M3 is a receiver. The reference impulse radio units R1–R4 can interact with different types of robots R1–R3 to help in the determination of the positions of the mobile apparatuses.

Antennae Architectures

Figure 22:
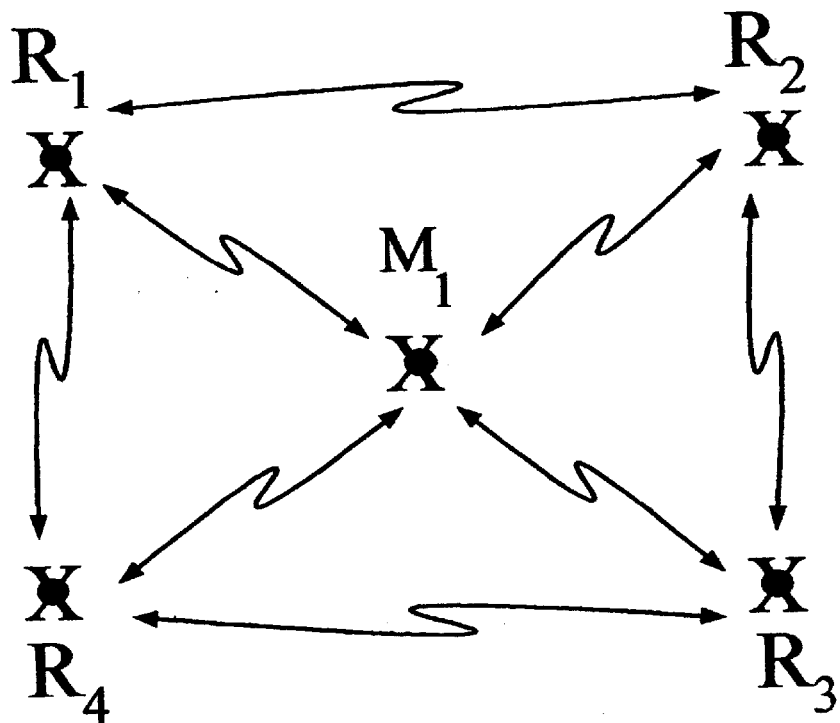
FIG. 22 is a diagram of a steerable null antennae architecture capable of being used in an impulse radio positioning network in accordance the present invention.

Referring to FIG. 22, there is illustrated a diagram of a steerable null antennae architecture capable of being used in an impulse radio positioning network. The aforementioned impulse radio positioning networks can implement and use steerable null antennae to help improve the impulse radio distance calculations. For instance, all of the reference impulse radio units R1–R4 or some of them can utilize steerable null antenna designs to direct the impulse propagation; with one important advantage being the possibility of using fewer reference impulse radio units or improving range and power requirements. The robot M1 can also incorporate and use a steerable null antenna.

Figure 23:
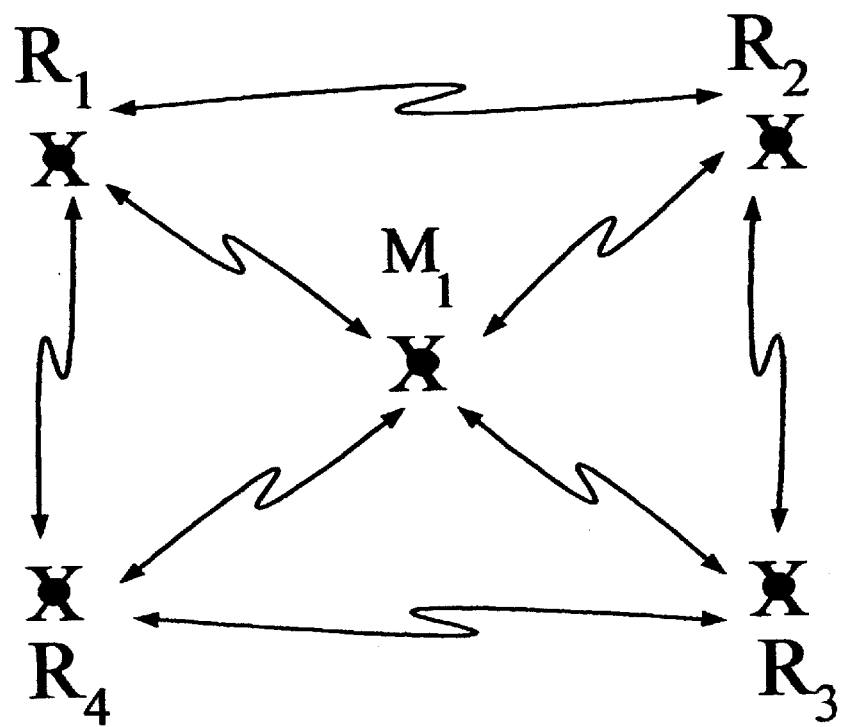
FIG. 23 is a diagram of a specialized difference antennae architecture capable of being used in an impulse radio positioning network in accordance the present invention.

Referring to FIG. 23, there is illustrated a diagram of a specialized difference antennae architecture capable of being used in an impulse radio positioning network. The reference impulse radio units R1–R4 of this architecture may use a difference antenna analogous to the phase difference antenna used in GPS carrier phase surveying. The reference impulse radio units R1–R4 should be time synched and the robot M1 should be able to transmit and receive.

Figure 24:
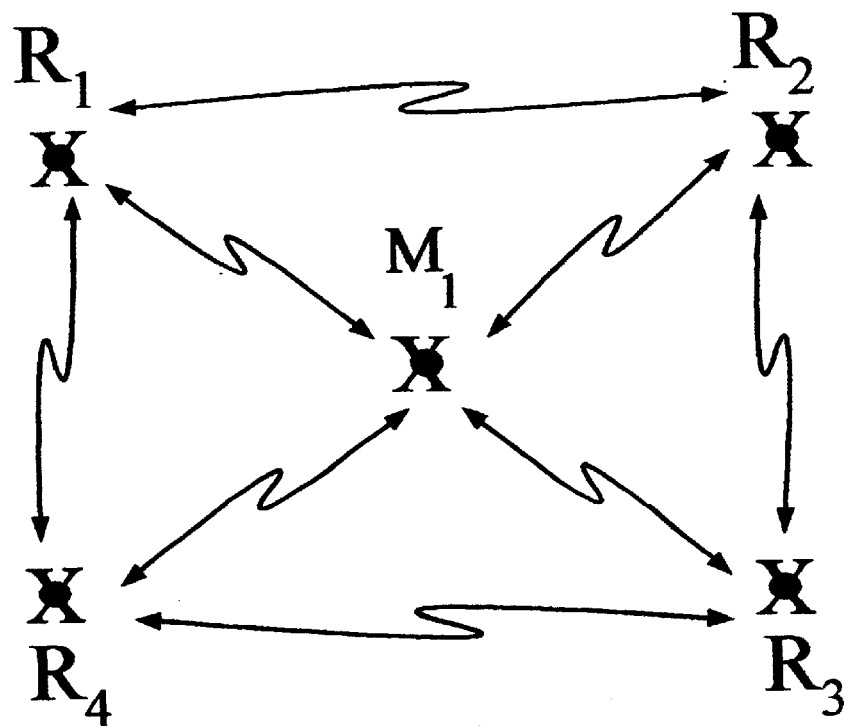
FIG. 24 is a diagram of a specialized directional antennae architecture capable of being used in an impulse radio positioning network in accordance with the present invention.

Referring to FIG. 24, there is illustrated a diagram of a specialized directional antennae architecture capable of being used in an impulse radio positioning network. As with the steerable null antennae design, the implementation of this architecture is often driven by design requirements. The reference impulse radio units R1-R4 and the mobile apparatus A1 can incorporate a directional antennae. In addition, the reference impulse radio units R1–R4 are likely time-synched.

Figure 25:
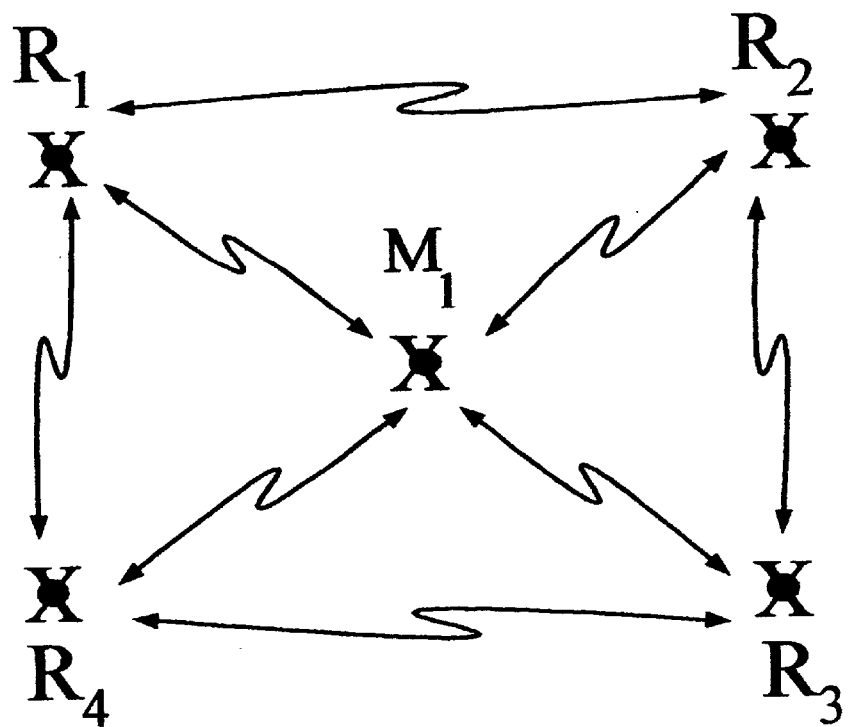
FIG. 25 is a diagram of an amplitude sensing architecture capable of being used in an impulse radio positioning network in accordance with the present invention.

Referring to FIG. 25, there is illustrated a diagram of an amplitude sensing architecture capable of being used in an impulse radio positioning network. Herein, the reference impulse radio units R1–R4 are likely time-synched. Instead of the robot M1 and reference impulse radio units R1–R2 measuring range using TOA methods (round-trip pulse intervals), signal amplitude is used to determine range. Several implementations can be used such as measuring the "absolute" amplitude and using a pre-defined look up table that relates range to "amplitude" amplitude, or "relative" amplitude where pulse amplitudes from separate radios are differenced. Again, it should be noted that in this, as all architectures, the number of radios is for illustrative purposes only and more than one mobile impulse radio can be implemented in the present architecture.

From the foregoing, it can be readily appreciated by those skilled in the art that the present invention provides a system, a robot and a method that can use the communication capabilities of impulse radio technology to help a control station better control the actions of the robot. The robot can take many different forms and can have a telepresence capability and/or a teleoperation capability.

While particular embodiments of the present invention have been described, it should be understood, however, that the invention is not limited thereto, since modifications may be made by those skilled in the art, particulary in light of the foregoing. Therefore, it is contemplated by the appended claims to cover any such modifications or applications that incorporate those features or those improvements which embody the spirit and scope of the present invention.

Search and Rescue Operations

One such alternate application contemplated is the use of the robot 902 to perform a wide-variety of search and rescue operations. For instance, the robot 902 can be sent in to search for survivors in a building that has been demolished by some disaster such as an earth quake, explosion, mud slide or the like. In particular, a person can use the central station 904 to effectively communicate with and control the actions of the robot 902 that is moving around within the demolished building. In contrast, a conventional central station would have difficulty communicating with and controlling the actions of a traditional robot due to the aforementioned "multipath" and "dead zones" problems associated with traditional radio communications. In fact, the robot 902 can be equipped with a video camera which enables the robot 902 to send pictures using impulse radio signals to the central station 904. And, the robot 902 can also be equipped with an impulse radio unit that has a radar capability which can detect people located beneath a floor, roof and other debris. Another search and rescue application contemplated is the use of a robot 902 by law enforcement personnel in a hostage situation and similiar situations.

Hazardous Locations

Another such alternate application contemplated is the use of the robot 902 to perform a wide-variety of operations in a hazardous or dangerous area. For instance, the robot 902 can be sent in to monitor the environment and possibly perform specific tasks in a hazardous location such as a chemical plant or a tank/pipe. In particular, a person can use the central station 904 to effectively communicate with and control the actions of the robot 902 that is moving around within a hazardous location such as a chemical plant or a tank/pipe. In fact, the range of the robot 902 located within a pipe can be determined by using one or more impulse radio units located at one or both ends of the pipe. Another hazardous application contemplated is the use of a robot 902 in space where the high bandwidth feature of the impulse radio signals gives the robot 902 a major advantage over traditional robots.

Land Mines

Yet another such alternate application contemplated is the use of the robot 902 to help place land mines. For instance, a group of robots may be attached to land mines and form an ad hoc network such that if someone removes some of the land mines to make a pathway then the robots can become aware of which area has been cleared and then jump into the cleared area. These self-healing land mines (robots) don't require the use of a central station 904 and can use the GPS to help keep track of where they are located with respect to one another.

On the other hand, the robot(s) 902 can be used to help detect land mines so they can be removed or deactivated. For instance, the robot 902 including an impulse radio unit that has a radar capability can travel through a land mine field and detect the locations of land mines. The robot 902 can even map the location of the land mines such that they can be removed or deactivated. To help map the location of the detected land mines, another robot 902 including an impulse radio unit can be used to monitor the range and/or position of the moving robot 902 that is detecting the land mines.

Surveillance

Still yet another alternate application contemplated is the use of the robot 902 to perform a wide-variety of surveillance operations. For instance, a group of robots 902 in the shape of micro air vehicles can form an ad hoc network that can operate in concert with one another to obtain information such as the presence of chemical weapons, troops and/or to generate a picture of the ground, a building or a manufacturing center. In other words, the micro air vehicles (robot 902) can be used to obtain a wide variety of information without being detected by the people or the things being monitored. In addition, the robot 902 can take the form of a micro unmanned ground vehicle instead of a micro air vehicle.

Domestic Applications

Still yet another alternate application contemplated is the use of the robot 902 to perform a wide-variety of domestic tasks. For instance, a person can use the central station 904 to effectively communicate with and control the actions of the robot 902 in the form of a lawn mower or vacuum sweeper. Alternatively, the robot 902 having the form of a lawn mower or vacuum sweeper can be programmed to operate itself and mow a lawn or vacuum inside a building by knowing its position through its interaction with the reference impulse radio units 1002 and the central station 904.

What is claimed is:

1. A method for controlling a robot, said method comprising the steps of:

attaching, to the robot, an ultra wideband carrier wave-less impulse radio unit;

receiving, at a control station, impulse radio signals containing information from the ultra wideband carrier wave-less impulse radio unit attached to the robot;

using, at the control station, at least a portion of the received information to control the actions of the robot; and determining the position of the robot from the interaction between the ultra wideband carrier wave-less impulse radio unit and at least two of a plurality of reference ultra wideband carrier wave-less impulse radio units, wherein said control station can use the determined position of the robot to control the actions of the robot.

2. The method of claim 1, wherein at least a portion of the received information includes information about an area surrounding the robot.

3. The method of claim 2, wherein said information about the area surrounding the robot is in video form.

4. The method of claim 1, further comprising the step of enabling the ultra wideband carrier wave-less impulse radio unit to interact with a plurality of sensors that obtain at least a portion of the information.

5. A robot comprising:

a movable platform;

an ultra wideband carrier wave-less impulse radio unit for transmitting an impulse radio signal containing information to a control station that uses at least a portion of the information to control the actions of the robot; and said ultra wideband carrier wave-less impulse radio unit interacts with at least two of a plurality of reference ultra wideband carrier wave-less impulse radio units to enable a determination to be made as to a current position of the robot which can be used by the control station in controlling the actions of the robot.

6. The robot of claim 5, wherein at least a portion of the received information includes information about an area surrounding the robot.

7. The robot of claim 6, wherein said information about the area surrounding the robot is in video form.

8. The robot of claim 5, further comprising a plurality of sensors, coupled to the ultra wideband carrier wave-less impulse radio unit, for obtaining at least a portion of the information.

9. A system comprising:

a control station;

a robot including an ultra wideband carrier wave-less impulse radio unit for transmitting an impulse radio signal containing information to said control station that uses at least a portion of the information to control the actions of the robot, wherein at least a portion of the received information includes information about an area surrounding the robot that is in video form; and a plurality of reference ultra wideband carrier wave-less impulse radio units at least two of which interact with the ultra wideband carrier wave-less impulse radio unit of the robot to enable a determination to be made as to a current position of the robot which can be used by the control station to control the actions of the robot.

10. The system of claim 9, wherein said robot further includes a plurality of sensors, coupled to the ultra wideband carrier wave-less impulse radio unit, for obtaining at least a portion of the information.

11. A robot comprising:

an ultra wideband carrier wave-less impulse radio unit for transmitting an impulse radio signal containing information to a control station that uses at least a portion of the information to control the actions of the robot, wherein at least a portion of the received information includes information about an area surrounding the robot that is in video form; and said ultra wideband carrier wave-less impulse radio unit for interacting with at least two of a plurality of reference ultra wideband carrier wave-less impulse radio units to enable a determination to be made as to a current position of the robot which can be used by the control station in controlling the actions of the robot.

12. The robot of claim 11, wherein said robot can be used for search and rescue operations.

13. The robot of claim 12, wherein said ultra wideband carrier wave-less impulse radio unit further includes an ultra wideband carrier wave-less impulse radio radar capability and can detect a person.

14. The robot of claim 11, wherein said robot can be attached to a self-healing land mine, wherein said control station is another robot that is also attached to a self-healing land mine.

15. The robot of claim 11, wherein said ultra wideband carrier wave-less impulse radio unit further includes an ultra wideband carrier wave-less impulse radio radar capability and can detect a land mind.

16. The robot of claim 11, wherein said robot can be a micro vehicle which is used to obtain information without being detected by people or things being monitored.

17. The robot of claim 16, wherein said micro vehicle is a micro air vehicle or a micro unmanned ground vehicle.

18. The robot of claim 11, wherein said robot can be used to perform domestic tasks.

* * * * *